United States Patent [19]

Masuda et al.

[11] Patent Number: 4,639,554
[45] Date of Patent: Jan. 27, 1987

[54] DUAL-TONE MULTIPLE-FREQUENCY-SIGNAL GENERATING APPARATUS

[75] Inventors: Eiji Masuda, Kawasaki; Yasuhiko Fujita, Tokyo, both of Japan

[73] Assignee: Kabushiki Kaisha Toshiba, Kawasaki, Japan

[21] Appl. No.: 685,834

[22] Filed: Dec. 24, 1984

[30] Foreign Application Priority Data

Dec. 26, 1983 [JP] Japan ................... 58-244116
Dec. 26, 1983 [JP] Japan ................... 58-244117
Dec. 26, 1983 [JP] Japan ................... 58-244118

[51] Int. Cl.$^4$ .................... H03K 1/16; G06F 15/20
[52] U.S. Cl. ........................ 340/365 S; 379/361
[58] Field of Search .................. 179/84 VF, 90 K;
340/365 S; 328/14; 235/152

[56] References Cited

U.S. PATENT DOCUMENTS 3,820,028 6/1974 Thomas ................. 179/90 K X
3,999,049 12/1976 Roche et al. ............ 179/90 K X
4,315,108 2/1982 Hoffman et al. ............ 179/84

Primary Examiner—James L. Dwyer
Attorney, Agent, or Firm—Finnegan, Henderson, Farabow, Garrett & Dunner

[57] ABSTRACT

A dual-tone multiple-frequency (DTMF)-signal generating apparatus of the present invention is provided with a high-group frequency divider and a low-group frequency divider for dividing a reference frequency signal into high-group frequencies and low-group frequencies, respectively. The respective outputs from the high-group divider and the low-group divider are supplied to a high-group-sine-wave-signal generator and a low-group-sine-wave-signal generator. The high- and low-group-sine-wave-signal generators comprise a plurality of bi-stable circuits and include shift registers for sequentially shifting a divided input signal within a predetermined period, a plurality of switches which selectively pass high or low level signal corresponding to the outputs of the respective bi-stable circuits, and a plurality of capacitive elements in which the terminals on one side thereof are supplied with the high or low level passed by the plurality of switches, and the terminals on the other side thereof are commonly connected, the high or low level being applied to the comon connection for every cycle of the shift registers to produce the high- and low-group-sine-wave signals from the common connection. The respective sine wave signals are level converting by a high-group level converter comprising a capacitor and a switch and by a low-group level converter comprising a capacitor and a switch. The level converted high- and low-group-sine-wave signals are combined by a mixer comprising buffer amplifiers, resistors and a transistor, thereby obtaining a DTMF signal.

34 Claims, 39 Drawing Figures

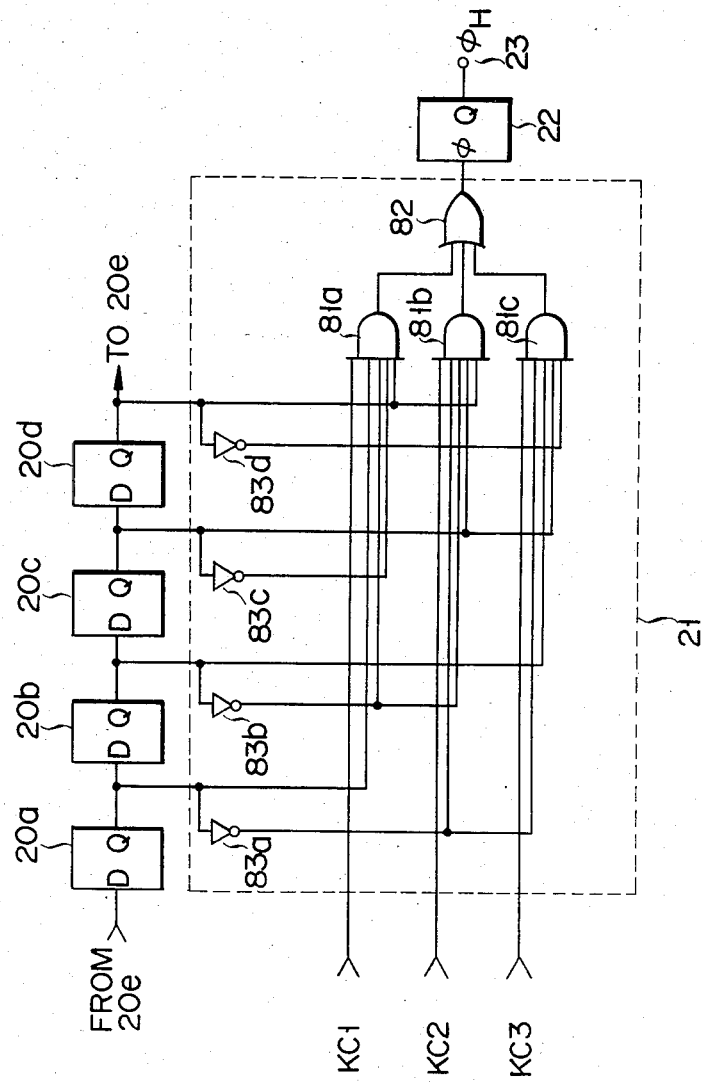
F I G. 4

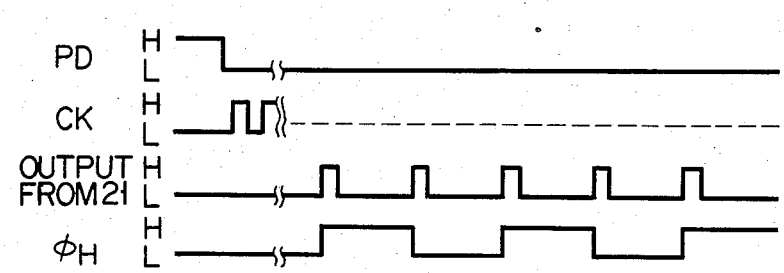
FIG. 5A PD
FIG. 5B CK
FIG. 5C OUTPUT FROM 21
FIG. 5D $\phi_H$
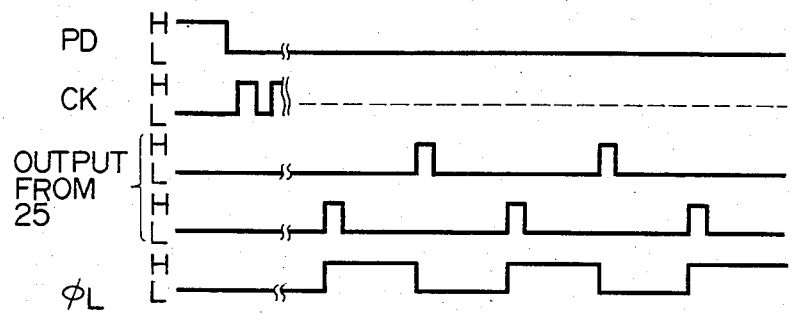
FIG. 8A PD
FIG. 8B CK
FIG. 8C OUTPUT FROM 25
FIG. 8D
FIG. 8E $\phi_L$
FIG. 10
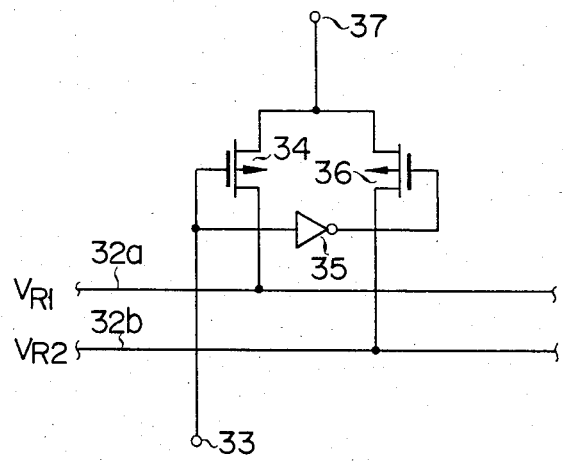

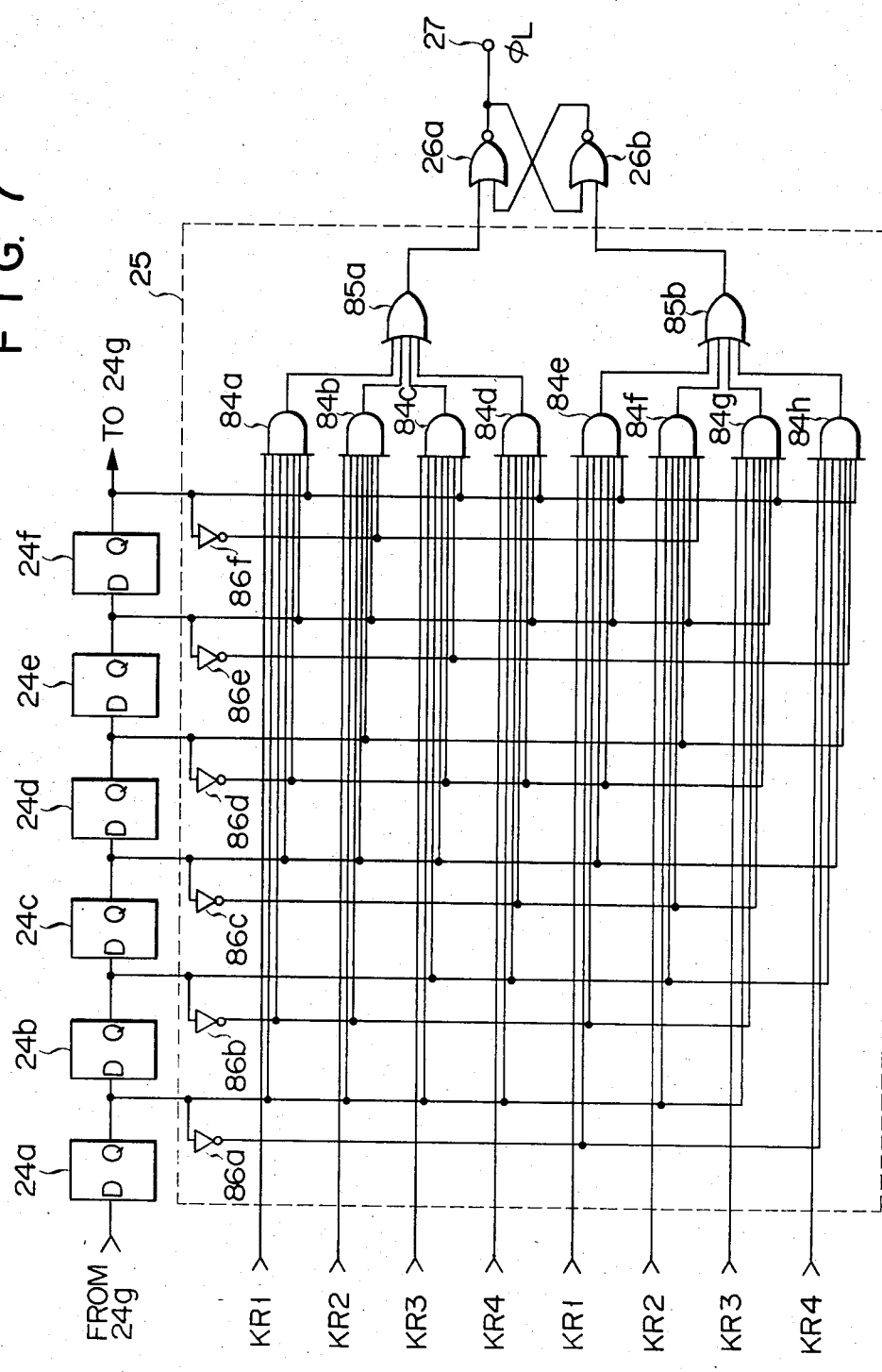

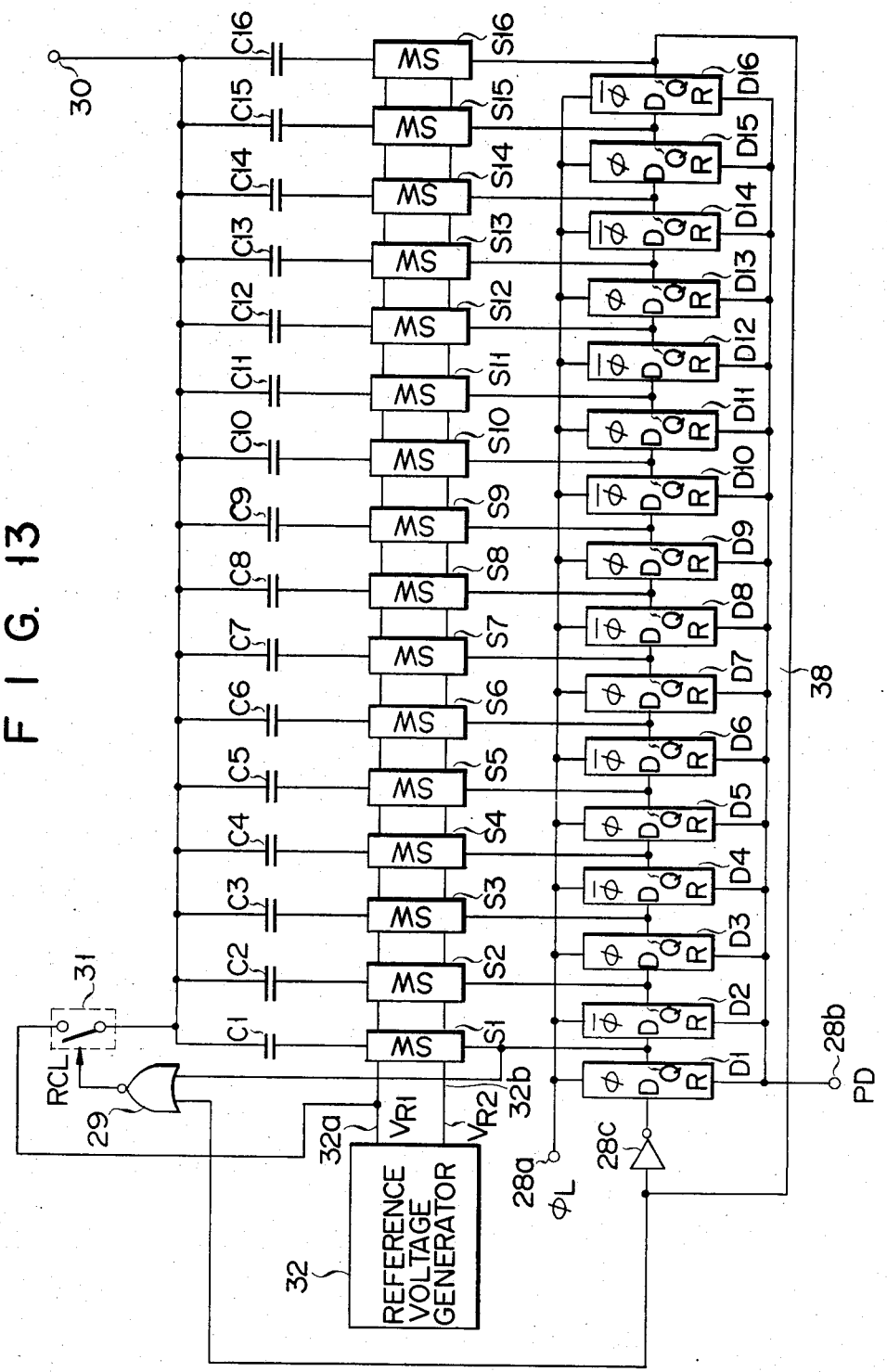
F I G. 13

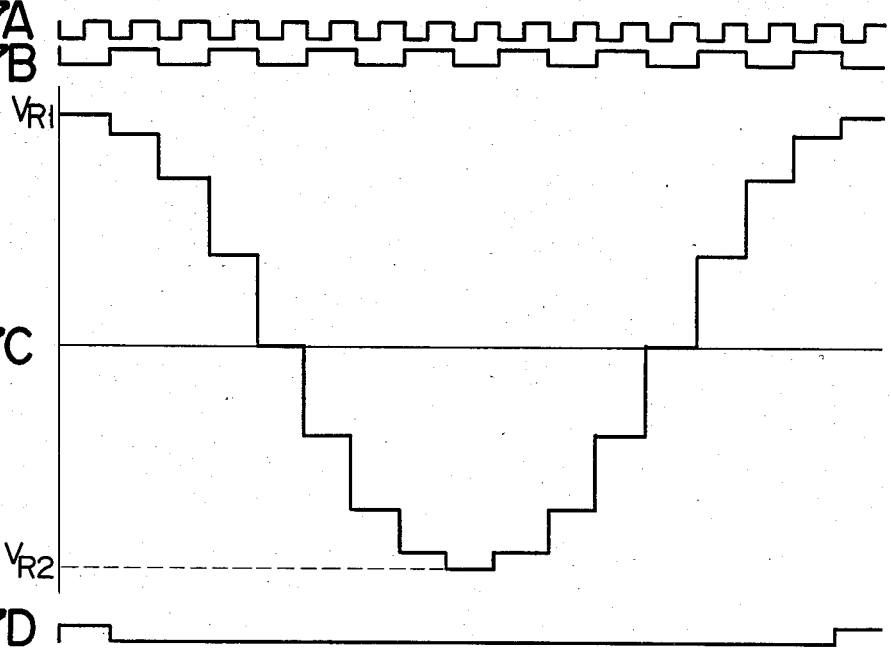
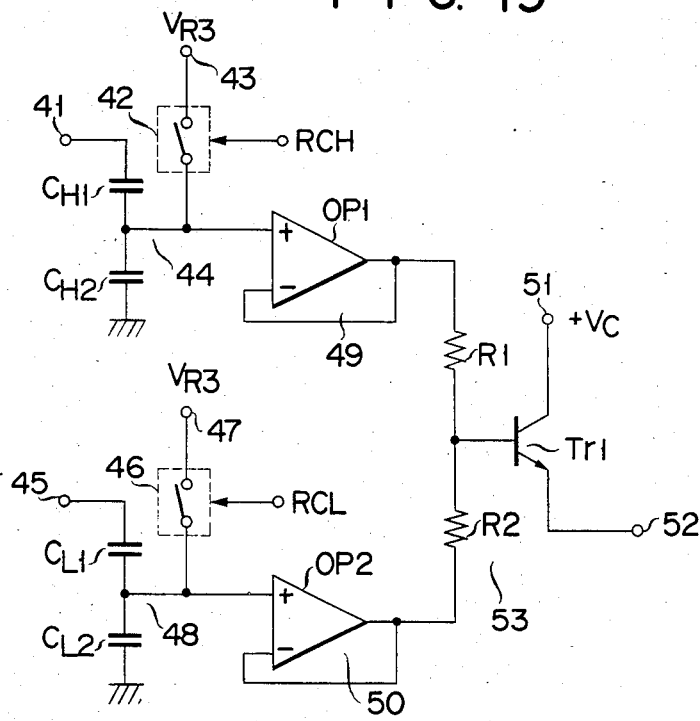

F I G. 21
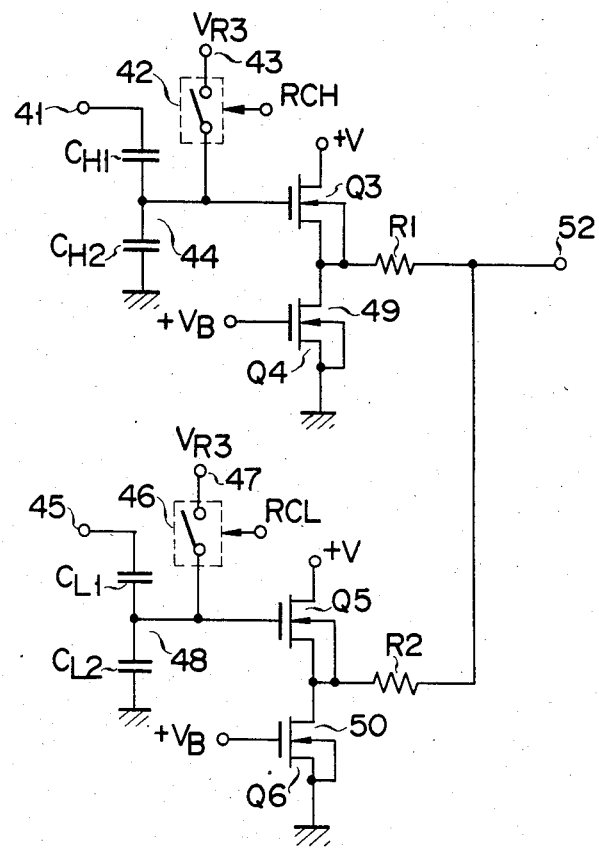

F I G. 22
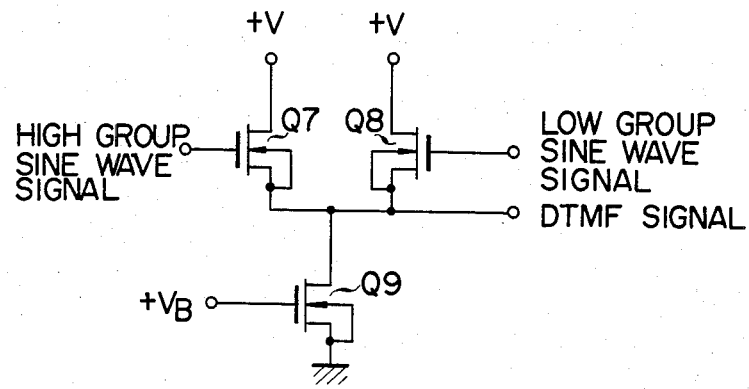
F I G. 23
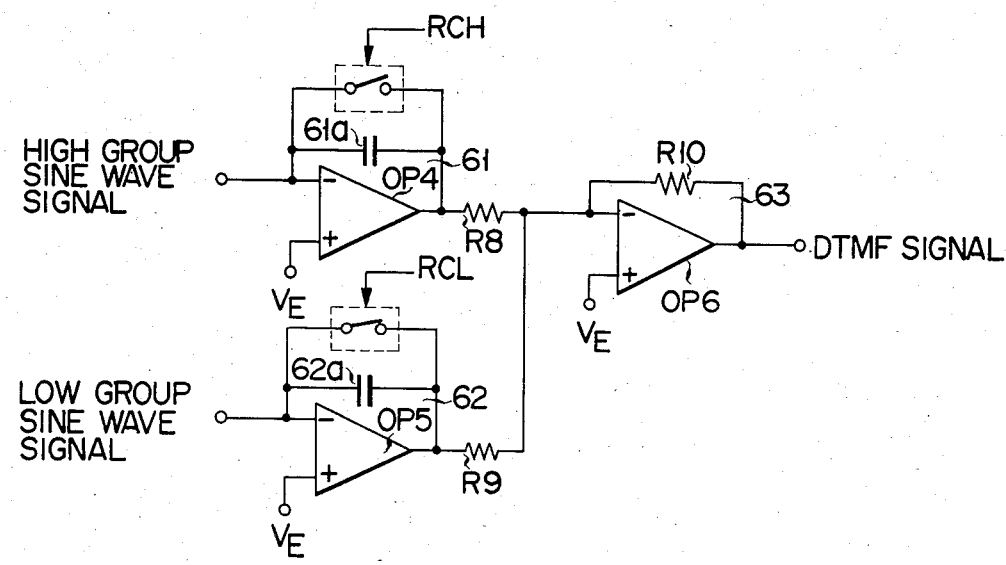

F I G. 24
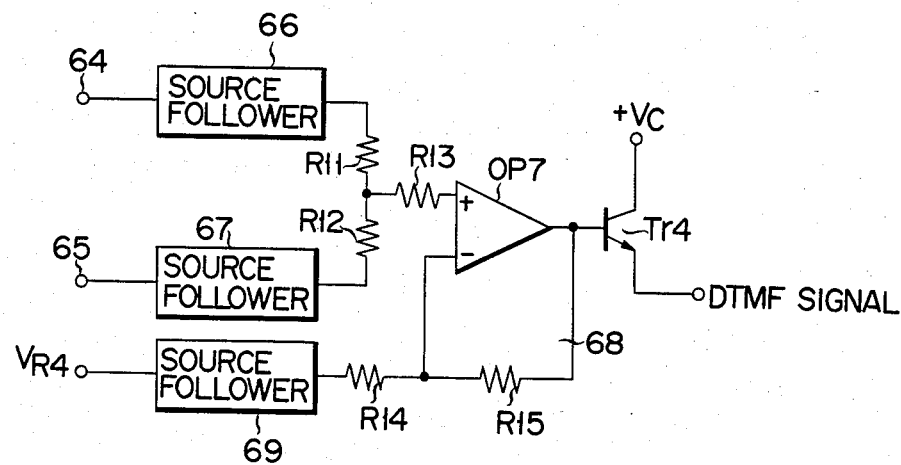
F I G. 25
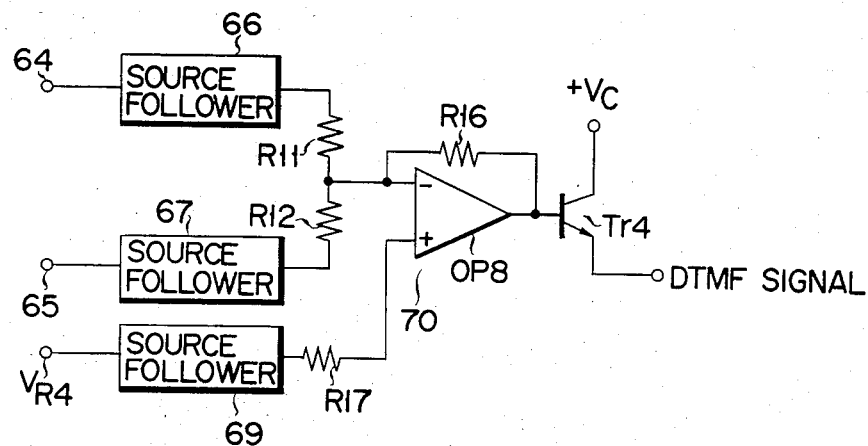

DUAL-TONE MULTIPLE-FREQUENCY-SIGNAL GENERATING APPARATUS

BACKGROUND OF THE INVENTION

The present invention relates to a dual-tone multiple-frequency (DTMF)-signal generating apparatus for use with a telephone communication system, and particularly relates to an apparatus for generating a DTMF signal, corresponding to a key operation of a push button phone, and transmitting it on a standard telephone communication line.

A conventional DTMF signal generating apparatus divides a reference clock signal, generated from a reference oscillating circuit, into each row and column of an actuated key, and produces a DTMF signal corresponding to the actuated key by transforming the frequency-divided signals into sine waveforms with different respective standard frequencies.

A prior art DTMF signal generating apparatus cannot oscillate unless the communication line voltage is above 3.0 V to 3.5 V, and current dissipation is high because of the high frequency, for example, 3.58 MHz, of a frequency clock signal from the reference oscillating circuit.

However, the line voltage of an actual telephone communication line may decrease to about 1.5 V to 2.0 V. With such low voltage, the prior art DTMF signal generating apparatus cannot be operated. Furthermore, in a prior art DTMF signal generating apparatus, the current dissipation is high, and the construction of the frequency divider is complicated. Furthermore, a 3.5 MHz crystal resonator used for the reference oscillating circuit is costly.

To eliminate such drawbacks, lowering the frequency of the reference clock signal has been considered in order to decrease the current dissipation and to operate at a lower voltage.

However, simply lowering the frequency of the reference clock signal makes it difficult to determine the frequency division ratio for dividing the clock signal into standard frequencies for each row and column of the key matrix, and makes the construction of the frequency divider more complicated, thereby making it difficult to product a highly accurate DTMF signal.

Therefore, a DTMF signal generating apparatus which has a simple construction and low cost and which can operate with high stability and lower voltage has been in demand.

In addition to the above, an integrated DTMF signal generating apparatus with CMOS devices has been in strong demand.

SUMMARY OF THE INVENTION

An object of the present invention is to provide a DTMF signal generating device which has a simple construction and low cost, operates at a lower voltage, and facilitates integration.

To achieve the above object, a DTMF signal generating apparatus according to the present invention comprises:

key input means which is arranged in a matrix;

reference-frequency-signal generating means for generating a reference frequency signal;

frequency dividing means for dividing, corresponding to a key actuated by said key input means, the reference frequency signal from said reference-frequency-signal generating means and for producing first and second frequency-divided signals;

sine-wave-signal generating means for generating respective first and second sine wave signals having approximately the same cycles as those of first and second standard frequencies using the first and second frequency-divided signals from said frequency dividing means;

first level converting means with high input impedance for receiving and level converting the first sine wave signal;

second level converting means with high input impedance for receiving and level converting the second sine wave signal; and mixing means connected to said first and second level converting means for combining the level converted first and second sine wave signals output from said first and second level converting means.

BRIEF DESCRIPTION OF THE DRAWINGS

Other objects and features of the present invention will be apparent from the following description taken in connection with the accompanied drawings in which:

FIG. 4 is a detailed circuit diagram of a programmable status detector 21 shown in FIG. 3;

FIGS. 5A through 5D are timing charts showing an operation of th high-group frequency divider shown in FIG. 3;

FIG. 7 is a detailed circuit diagram of a programmable status detector shown in FIG. 6;

FIGS. 8A through 8E are timing charts for explaining an operation of the low-group frequency divider in FIG. 5;

FIG. 10 is a detailed circuit diagram of a switch circuit in the high-group-sine-wave generator in FIG. 9;

FIG. 13 is a detailed block diagram of the low-group-sine-wave generator shown in FIG. 1;

FIGS. 17A through 17D are timing charts of the low-group-sine-wave generator in FIG. 16;

FIG. 19 is a block diagram showing an output-signal-mixing circuit for the respective low- and high-group-sine-wave generators in FIGS. 9 and 13;

FIG. 21 is a detailed circuit diagram of the output-signal-mixing circuit in the embodiment of FIG. 1; and FIGS. 22 through 25 are modified circuits of the output-signal-mixing circuit in FIG. 1.

DETAILED DESCRIPTION OF THE PREFERRED EMBODIMENTS

Figure 1:
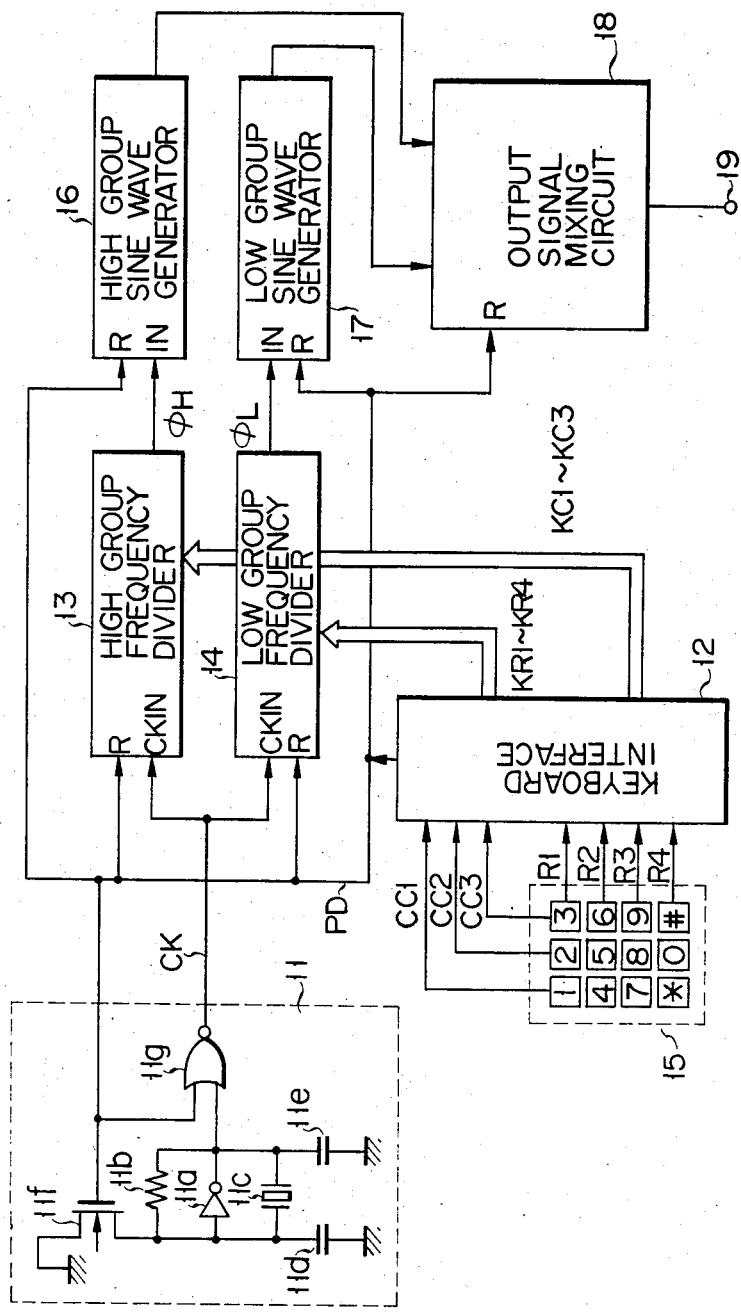
FIG. 1 is a block diagram with a partial circuit diagram showing an embodiment of a DTMF signal generating apparatus of the present invention.

An embodiment of the invention will now be described referring to the drawings.

In FIG. 1, a reference oscillator 11 comprises an inverter 11a, a resistor 11b, a ceramic resonator 11c having a natural frequency of 480 KHz, capacitors 11d and 11e, an N channel MOS transistor 11f and a NOR circuit 11g. When a power down signal PD from a keyboard interface circuit 12 (to be described later) is active, namely, whose level is high, the transistor 11f turns on. Then, the oscillation is ceased, and the NOR circuit 11g is gated to produce a low level signal, thereby deactivating the reference oscillator 11.

On the other hand, when the power down signal PD is inactive, namely, whose level is low, the transistor 11f turns off. Then, the oscillation starts and the NOR circuit 11g is opened, thereby enabling the reference oscillator to produce a 480 KHz reference clock signal CK.

The reference clock signal CK is supplied to each clock input terminal CKIN of a high-group frequency divider 13 and a low-group frequency divider 14. Further, the power down signal PD is supplied to each reset input terminal R of the high- and low-group frequency dividers 13 and 14. Therefore, when the power down signal PD is active, the high- and low-group frequency dividers 13 and 14 are deactivated.

On the other hand, when the signal PD is inactive, the high- and low-group frequency dividers 13 and 14 are enabled to thereby divide the reference clock signal CK according to a frequency division ratio from a keyboard interface circuit 12.

The keyboard interface circuit 12 generates frequency division ratios for a column and row corresponding to any actuated key among the twelve keys, arranged in three columns and four rows, in a key operation section 15 shown in the dotted lines. The key operation section 15 having three column signal lines $CC_1$ through $CC_3$ and four column signal lines $R_1$ through $R_4$ activates the column and the row signal lines $CC_1$ through $CC_3$ and $R_1$ through $R_4$ on which the actuated key is located. For example, when the key "5" is actuated, the column signal line $CC_2$ and the row signal line $R_2$ become active.

As described above, when any one of the column signal lines $CC_1$ through $CC_3$ and the row signal lines $R_1$ through $R_4$ is active, the keyboard interface circuit 12 feeds 3-bit high-group-frequency-division ratio (HGFDR) data $KC_1$ through $KC_3$ corresponding to a column to a high-group frequency divider 13 as well as feeds 4-bit low-group-frequency-division ratio (LGFDR) data $KR_1$ through $KR_4$ corresponding to a row to a low-group frequency divider 14. For example, as described above when the key "5" is actuated, data of "0, 1, 0", corresponding to the active column signal line $CC_2$, is produced as the HGFDR data $KC_1$ through $KC_3$, and the data of "0, 1, 0, 0", corresponding to the active row signal line $R_2$, is produced as the LGFDR data $KR_1$ through $KR_4$.

The keyboard interface circuit 12 activates and deactivates the power down signal PD; the level of the signal PD will be high when none of the keys are actuated, and the level thereof will be low, when the column and row signal lines $CC_1$ through $CC_3$ and $R_1$ through $R_4$ are active due to any key being actuated.

According to the HGFDR data $KC_1$ through $KC_3$ and the LGFDR data $KR_1$ through $KR_4$ produced above, the high- and low-group frequency dividers 13 and 14 divide the reference clock signal CK. The high-group frequency divider 13 receives the HGFDR data $KC_1$ through $KC_3$, corresponding to the active column signal line $CC_1$, to divide the reference clock signal CK of 480 KHz by 22. Furthermore, the high-group frequency divider 13 receives the HGFDR data $KC_1$ through $KC_3$, corresponding to the active column signal lines $CC_2$ and $CC_3$, to divide the reference clock signal CK by 20 and 18, respectively.

The low-group frequency divider 14 receives the LGFDR data $KR_1$ through $KR_4$, corresponding to the active row signal line $R_1$, to divide the reference clock signal CK by 43. Furthermore, the low-group frequency divider 14 receives the LGFDR data $KR_1$ through $KR_4$ corresponding to the active row signal lines $R_2$, $R_3$ and $R_4$ to divide the reference clock signal CK by 39, 35 and 32, respectively.

The above division factors "22", "20", "18", "43", "39", "35" and "32", to be described later in detail, are selected to achieve standard frequencies for every column and row of the key operation section 15.

A high-group frequency-divided signal (HGFD signal) $\phi_H$ and a low-group frequency-divided signal (LGFD signal) $\phi_L$, divided by the high-group frequency divider 13 and the low-group frequency divider 14, are supplied to the input terminals IN of the high-group-sine-wave generator 16 and the low-group-sine-wave generator 17, respectively. These high- and low-group-sine-wave generators 16 and 17 are deactivated when receiving, at their reset terminals R, the active power down signal PD and activated when receiving the inactive power down signal PD.

The high-group-sine-wave generator 16 generates a stepped high-group-sine-wave signal, which has a cycle of the HGFD signal $\phi_H$ divided by 18 and which varies its voltage level for every half cycle of the HGFD signal $\phi_H$. The low-group-sine-wave generator 17 generates a stepped low-group-sine-wave signal, which has a cycle of the low-group frequency-divided signal (LGFD signal) $\phi_L$ divided by 16 and which varies its voltage level for every half cycle of the LGFD signal $\phi_L$. That is, the high- and low-group-sine-wave signals are produced by dividing the HGFD signal $\phi_H$ and the LGFD signal $\phi_L$ by 18 and 16, respectively. The division factors "18" and "16" are also selected to achieve the standard frequencies for the respective columns and rows of the key operating section 15.

The high- and low-group-sine-wave signals from the high- and low-group-sine-wave generators 16 and 17 are combined by an output-signal-mixing circuit 18 to produce the DTMF signal corresponding to an activated key.

The DTMF signal is sent through an output terminal 19 to a telephone communication line (not shown), a switching unit (not shown) and so on. The power down signal PD is also supplied to a reset input terminal of the output-signal-mixing circuit 18. The output-signal-mixing circuit 18 is deactivated when the signal PD is active and vice versa.

As described above, the reference clock signal CK output from the reference oscillator 11 is divided in the high- and low-group frequency dividers 13 and 14 according to the division ratio for the column and row on which the activated key is located. Then, the HGFD signal $\phi_H$ and the LGFD signal $\phi_L$ are divided by 18 and 16 in the high- and low-group-sine-wave generators 16 and 17, respectively.

The output frequencies of high- and low-group frequency dividers 13 and 14 and the output frequencies of high- and low-group-sine-wave generators 16 and 17 are summarized in TABLE I. The table refers to the period when the column and row signal lines $CC_1$ through $CC_3$ and $R_1$ through $R_4$ become active.

TABLE I

| | Line | Division Ratio | Divider Output [KHz] | Division Ratio | Sine Wave Generator Output [Hz] | Standard Frequency [Hz] | Deviation [%] |
|---|---|---|---|---|---|---|---|
| Low-Group | $R_1$ | 43 | 11.16 | 16 | 697.7 | 697 | +0.10 |
| | $R_2$ | 39 | 12.31 | | 769.2 | 770 | −0.10 |
| | $R_3$ | 35 | 13.71 | | 857.1 | 852 | +0.60 |
| | $R_4$ | 32 | 15.00 | | 937.5 | 941 | −0.37 |
| High-Group | $CC_1$ | 22 | 21.82 | 18 | 1,212.1 | 1,209 | +0.26 |
| | $CC_2$ | 20 | 24.00 | | 1,333.3 | 1,336 | −0.20 |
| | $CC_3$ | 18 | 26.67 | | 1,481.5 | 1,477 | +0.30 |

As is apparent from TABLE I, the low-group frequency divider 14 divides the reference clock signal CK of 480 KHz by 43 to produce the LGFD signal $\phi_L$ of 11.16 KHz when the row signal line $R_1$ is activated. As a result, the low-group-sine-wave generator 17 divides the LGFD signal $\phi_L$ of 11.16 KHz by 16 to produce a divided low-group-sine-wave signal of 697.7 Hz. The thus produced low-group-sine-wave signal of 697.7 Hz has a deviation of only 0.1% against the standard frequency of 697 Hz, which is predetermined for the row signal line $R_1$. Therefore, an extremely accurate frequency for the row signal line $R_1$ can be obtained. Similarly, the corresponding rated frequencies for other signal lines $R_2$ through $R_4$ and $CC_1$ through $CC_3$ can be obtained.

Figure 2:
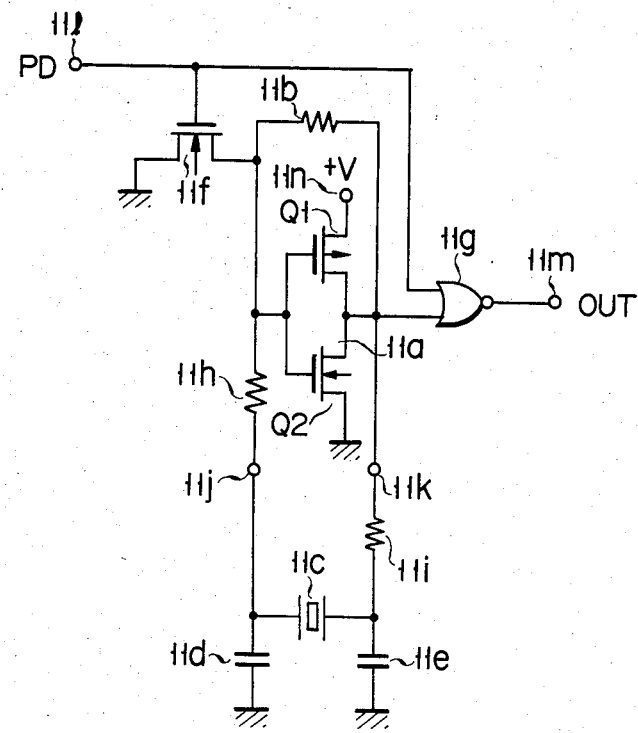
FIG. 2 is a detailed circuit diagram showing a reference oscillating circuit in the embodiment of FIG. 1.

The overall operation has thus been described, and now the detailed construction of the respective portions and their operations will be described. FIG. 2 shows a reference oscillator 11 in which the inverter 11a comprises a P channel MOS transistor $Q_1$ and an N channel MOS transistor $Q_2$ as shown. An input and output resistors 11h and 11i are connected to input and output terminals of the inverter 11a, respectively. The upper portion other than the connecting terminals 11j and 11k in the figure is integrated with CMOS devices. The output resistor 11i, the ceramic resonator 11c and the capacitors 11d and 11e are externally connected thereto. Further, 11l denotes an input terminal to which the power down signal PD is supplied, 11m denotes an output terminal connected to the clock input terminals (CKIN) of the high- and low-group frequency dividers 13 and 14, and 11n denotes a power supply terminal to which a DC voltage (+V) is applied.

The ceramic resonator 11c has the characteristic of a reference frequency of 480 KHz, a frequency tolerance of ±0.5%, a resonant resistance of 20 Ω or less, an antiresonant resistance of 70 KΩ or more and a temperature stability of ±0.3% (−20° C. through +80° C.). The resistance 11b performs a feedback function; the value of which is normally about 1 MΩ. The values of the input and output resistors 11h and 11i are about 1 KΩ, respectively, and the values of the capacitors 11d and 11e are approximately 100 PF.

Using the MOS transistors, the above reference oscillator 11 can perform a fully stable oscillation even at a voltage as low as 1.5 V through 2.0 V and is adapted to CMOS integration. Furthermore, since the reference clock signal CK is lowered to 480 KHz from the prior 3.58 MHz, operating dissipation current defined by a frequency × voltage × charge/discharge capacitance can be remarkably reduced. Furthermore, the ceramic resonator 11c is costly compared to a prior art crystal resonator.

The reference clock signal CK is selected to satisfy the following three conditions:

(i) The frequency value of the signal CK must be low to reduce the dissipation current while enabling fully stable oscillation even at a voltage as low as 1.5 V through 2.0 V, (ii) The frequency value must be high so as to enable the various frequency dividers in the downstream to perform stable dividing operations, and (iii) As shown in TABLE I, each frequency division ratio must be a simple integer, and its value must be set so as to produce a fully approximate frequency to the standard frequency.

The frequency of the reference clock signal CK is not necessarily 480 KHz, but some deviation from 480 KHz may be allowed.

Figure 3:
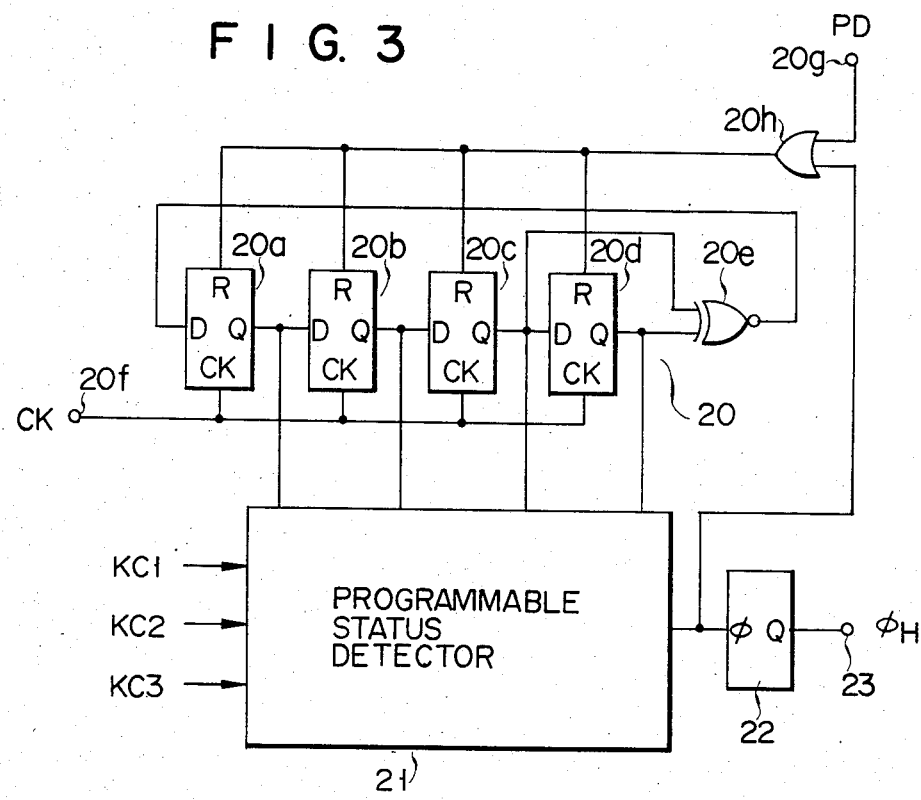
FIG. 3 is a detailed circuit diagram of a high-group frequency divider in the embodiment of FIG. 1.

FIG. 3 shows a high-group frequency divider 13. The high-group frequency divider 13 is functionally a programmable frequency divider and comprises a 4-bit shift register 20, a programmable status detector 21 and a binary counter 22. The 4-bit shift register 20 comprises four serially connected D type flip-flop circuits 20a through 20d (hereafter referred to as a DFF circuit). Each output terminal Q of the DFF circuits 20c and 20d is supplied to an EX-NOR circuit 20e, the output of which is supplied to the input terminal D of the DFF circuit 20a.

The respective clock input terminals CK of the DFF circuits 20a through 20d are connected to the input terminal 20f to which the reference clock signal CK is supplied. The input terminal 20g receiving the power down signal PD is connected through an OR circuit 20h to the respective reset input terminals R of the DFF circuits 20a through 20d. When any key in the key operating section 15 is actuated and the power down signal PD is inactive, that is, becomes low level, the reference oscillator 11 is driven to produce the reference clock signal CK shown in FIG. 4B. As a result, the 4-bit shift register 20 starts to operate, and the respective outputs of the DFF circuits 20a through 20d are supplied to the programmable status detector 21.

The programmable status detector 21 comprises, as shown in FIG. 4, multi-input AND gates 81a through 81c, a multi-input OR gate 82, the inputs of which are outputs of the AND gates 81a through 81c and inverters 83a through 83d which invert the respective outputs of the DFF circuits 20a through 20d.

The programmable status detector 21 performs a logical operation on the respective outputs of the DFF circuits 20a through 20d according to the HGFDR data $KC_1$ through $KC_3$ and divides the reference clock signal CK according to the division ratio specified by the HGFDR data $KC_1$ through $KC_3$ to produce the divided pulse signal shown in FIG. 5.

The divided pulse signal is supplied through the OR circuit 20h to the respective reset terminals R of the DFF circuits 20a through 20d to reset the 4-bit shift register 20 each time the signal level becomes high. Furthermore, the divided signal is supplied to the binary counter 22 to be level inverted at its respective leading edge to thereby produce the HGFD signal $\phi_H$ shown in FIG. 5D. The programmable status detector 21 controls and produces the HGFD signal $\phi_H$ in such a way that the ratio between the high and low level periods of the HGFD signal $\phi_H$ becomes approximately 50%. The HGFD signal $\phi_H$, output from the binary counter 22, is supplied through the output terminal 23 to the high-group-sine-wave generator 16.

Figure 6:
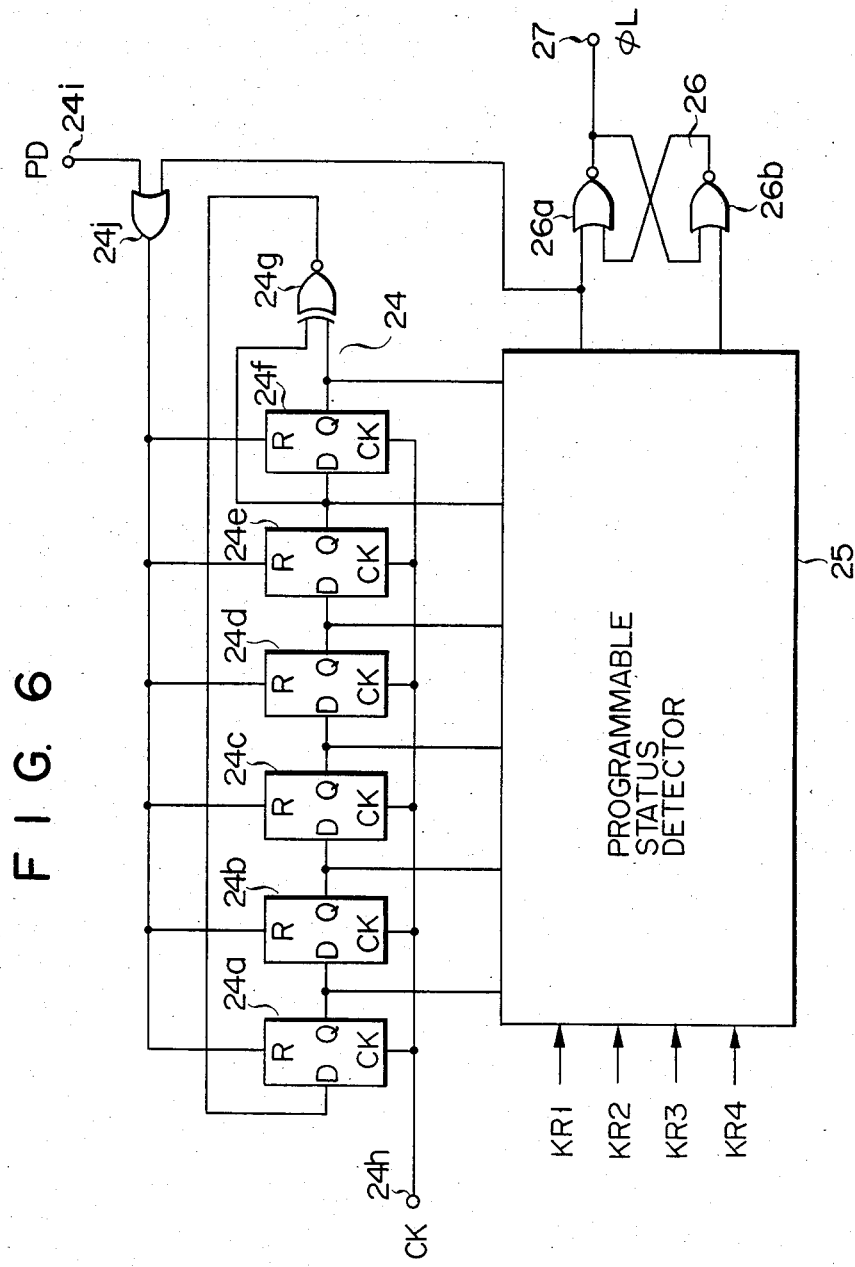
FIG. 6 is a detailed circuit diagram of a low-group frequency divider in the embodiment of FIG. 1.

FIG. 6 shows the low-group frequency divider 14. The low-group frequency divider 14 is also functionally a programmable divider and comprises a 6-bit shift register 24, a programmable status detector 25, and a set-reset type flip-flop circuit 26 (hereafter referred to as R-S FF circuit) comprised of NOR circuits 26a and 26b. The 6-bit shift register 24 comprises six serially connected DFF circuits 24a through 24f. The respective Q outputs of the DFF circuits 24e and 24f are supplied to the EX-NOR circuit 24g whose output is supplied to the input terminal D of the DFF circuit 24a.

The respective input terminals CK of the DFF circuits 24a through 24f are connected to the input terminal 24h to which the reference clock signal CK is supplied. The input terminal 24i to which the power down signal PD is supplied is connected to the respective reset terminals R of the DFF circuits 24a through 24f through the OR circuit 24j. When any key of the key operating section 15 is actuated and the power down signal PD is inactive or becomes low in level, as shown in FIG. 8A, the reference oscillator 11 is driven to produce the reference clock signal CK as shown in FIG. 8B. As a result, the 6-bit register 24 is activated and the respective outputs of the DFF circuits 24a through 24f are supplied to the programmable status detector 25.

The programmable status detector 25 is comprised of, as shown in FIG. 7, multi-input AND gates 84a through 84h, a multi-input OR gate 85b, the inputs of which are outputs of the AND gates 84e through 84h, and inverters 86a through 86f which invert the respective outputs of the DFF circuits 24a through 24f. The programmable status detector 25 performs an arithmetic operation on the outputs of the DFF circuits 24a through 24f according to the LGFDR data $KR_1$ through $KR_4$, and divides the reference clock signal CK according to the LGFDR data $KR_1$ through $KR_4$ to produce the divided pulse signals as shown in FIGS. 8C and 8D. One of the divided pulse signal (FIG. 8C) is supplied through the OR circuit 24j to the reset input terminals R of the DFF circuits 24a through 24f to reset the 6-bit shift register 24 when it is at a high level. These divided pulse signals are supplied to the R-S FF circuit 26 to be set at the leading edge of the divided pulse in FIG. 8D and to be reset at the leading edge of the divided pulse in FIG. 8C. As a result, the LGFD signal $\phi_L$ is produced. The programmable status detector 25 controls and outputs the divided pulse signal in such a way that the ratio between the high and low level periods of the LGFD signal $\phi_L$ is approximately 50%. The LGFD signal $\phi_L$ is output through the output terminal 27 to the low-group-sine-wave generator 17.

Figure 9:
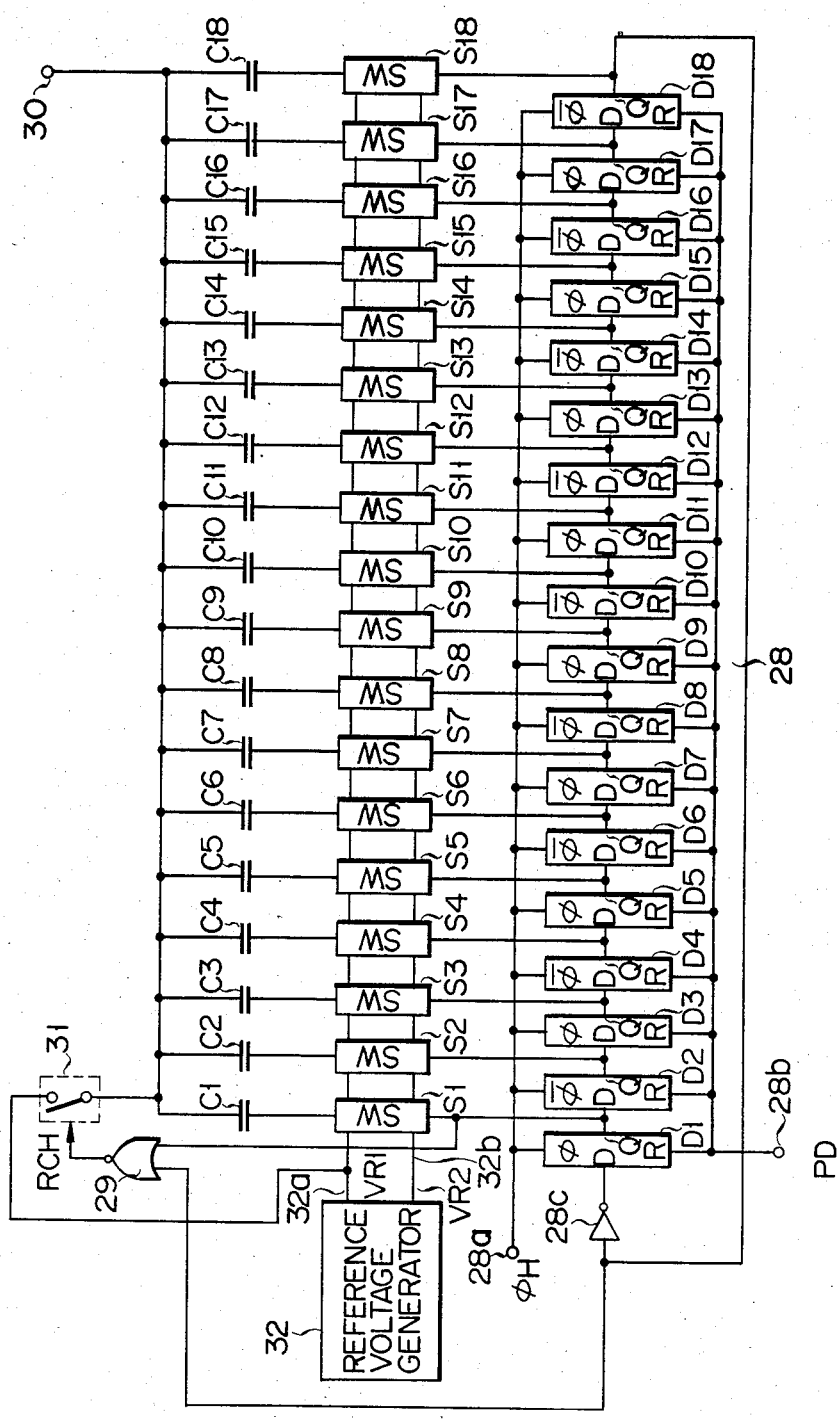
FIG. 9 is a detailed block diagram of a high-group-sine-wave generator in the embodiment of FIG. 1.

FIG. 9 shows a high-group-sine-wave generator 16. The eighteen DFF circuits $D_1$ through $D_{18}$ are serially connected to construct a 9-bit shift register 28. The odd-numbered DFF circuits $D_1$, $D_3$, $D_5$, $D_7$, $D_9$, $D_{11}$, $D_{13}$, $D_{15}$ and $D_{17}$ have the clock input terminals $\phi$ connected to the input terminal 28a to which the HGFD signal $\phi_H$ is supplied. In other words, the odd-numbered DFF circuits $D_1$ to $D_{17}$ latch the signal supplied to the input terminal D at the leading edge of the HGFD signal $\phi_H$ and the output from the output terminal Q. On the other hand, the even-numbered DFF circuits $D_2$, $D_4$, $D_6$, $D_8$, $D_{10}$, $D_{12}$, $D_{14}$, $D_{16}$ and $D_{18}$ have clock input terminals $\bar{\phi}$ connected to the input terminal 28a. In other words, the even-numbered DFF circuits $D_2$ to $D_{18}$ latch the signal supplied to the input terminal D and the outputs from the output terminal Q at the trailing edge of the HGFD signal $\phi_H$.

The reset input terminals R of the DFF circuits $D_1$ through $D_{18}$ are commonly connected to the input terminal 28b to which the power down signal PD is supplied. Furthermore, the output terminal Q of the final DFF circuit $D_{18}$ of the 9-bit shift register 28 is connected through the inverter 28c to the input terminal D of the DFF circuit $D_1$ as well as to an input terminal on one end of the NOR circuit 29.

The switch circuits $S_1$ through $S_{18}$ serve to selectively supply the reference voltages $V_{R1}$ and $V_{R2}$ output from the reference voltage generator 32 to the capacitors $C_1$ through $C_{18}$ in accordance with the outputs of the DFF circuits $D_1$ through $D_{18}$. An example of the switch circuits $S_1$ through $S_{18}$ is shown in FIG. 8. The input terminal 33 to which one of the outputs of the DFF circuits $D_1$ through $D_{18}$ is supplied is connected to a control electrode of a P channel MOS transistor 34 as well as to a control electrode of a P channel MOS transistor 36 through an inverter 35. One control electrode of the transistors 34 and 36 is connected to the power supply lines 32a and 32b to which the reference voltages $V_{R1}$ and $V_{R2}$ are applied, and the other control electrodes thereof are commonly connected to the output terminal 37 which is connected to the capacitors $C_1$ through $C_{18}$. As a result, when the output Q level of any of the DFF circuits $D_1$ to $D_{18}$ becomes high, the transistor 34 turns on, thereby producing a reference voltage $V_{R1}$ to the output terminal 37. On the other hand, when the output Q level of any of the DFF circuits $D_1$ to $D_{18}$ becomes low, the transistor 36 turns on, thereby producing the reference voltage $V_{R2}$ to the output terminal 37.

The relation between the reference voltages $V_{R1}$ and $V_{R2}$ is expressed by:

$$V_{R1} > V_{R2} \tag{1}$$

The reference voltage $V_{R1}$ may be a power supply voltage.

Furthermore, as shown in FIG. 9, the power supply line 32a to which the reference voltage $V_{R1}$ is applied is connected to the other terminal of the switch 31. The output terminal Q of the DFF circuit $D_1$ is connected to the input terminal of the NOR circuit 29. The switch 31 turns on and off when the output of the NOR circuit 29 is at high and low levels, respectively.

Figure 11:
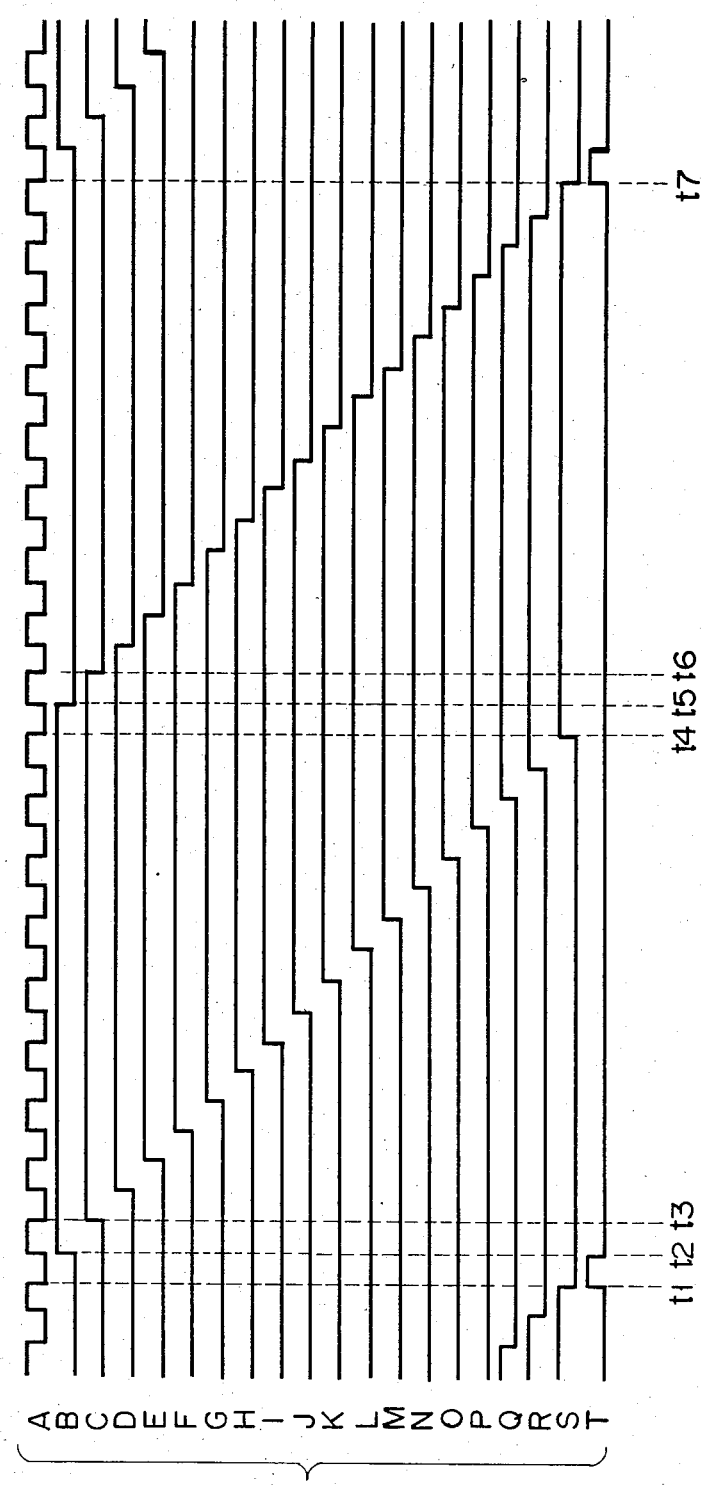
FIGS. 11A through 11T and FIGS. 12A through 12C are timing charts for explaining an operation of the high-group-sine-wave generator in FIG. 9.

An operation of the high-group-sine-wave generator 16 as constructed above will now be described. Supposed that the HGFD signal $\phi_H$ shown in FIG. 11A is supplied to the input terminal 28a. As a result, the output frequency of the DFF circuits $D_1$ through $D_{18}$, as shown in FIGS. 11B through 11S, equals that of the HGFD signal $\phi_H$ divided by 18, and its phase is half shifted to the signal $\phi_H$. As shown in FIG. 11T, the output level of the NOR circuit 29 becomes high for a period that is half that of the HGFD signal $\phi_H$ for every output cycle of the DFF circuit divided by 18 (see FIG. 11B). Hereafter, the output level of the rising NOR circuit 29 is taken as an RCH signal being generated.

Figure 12:
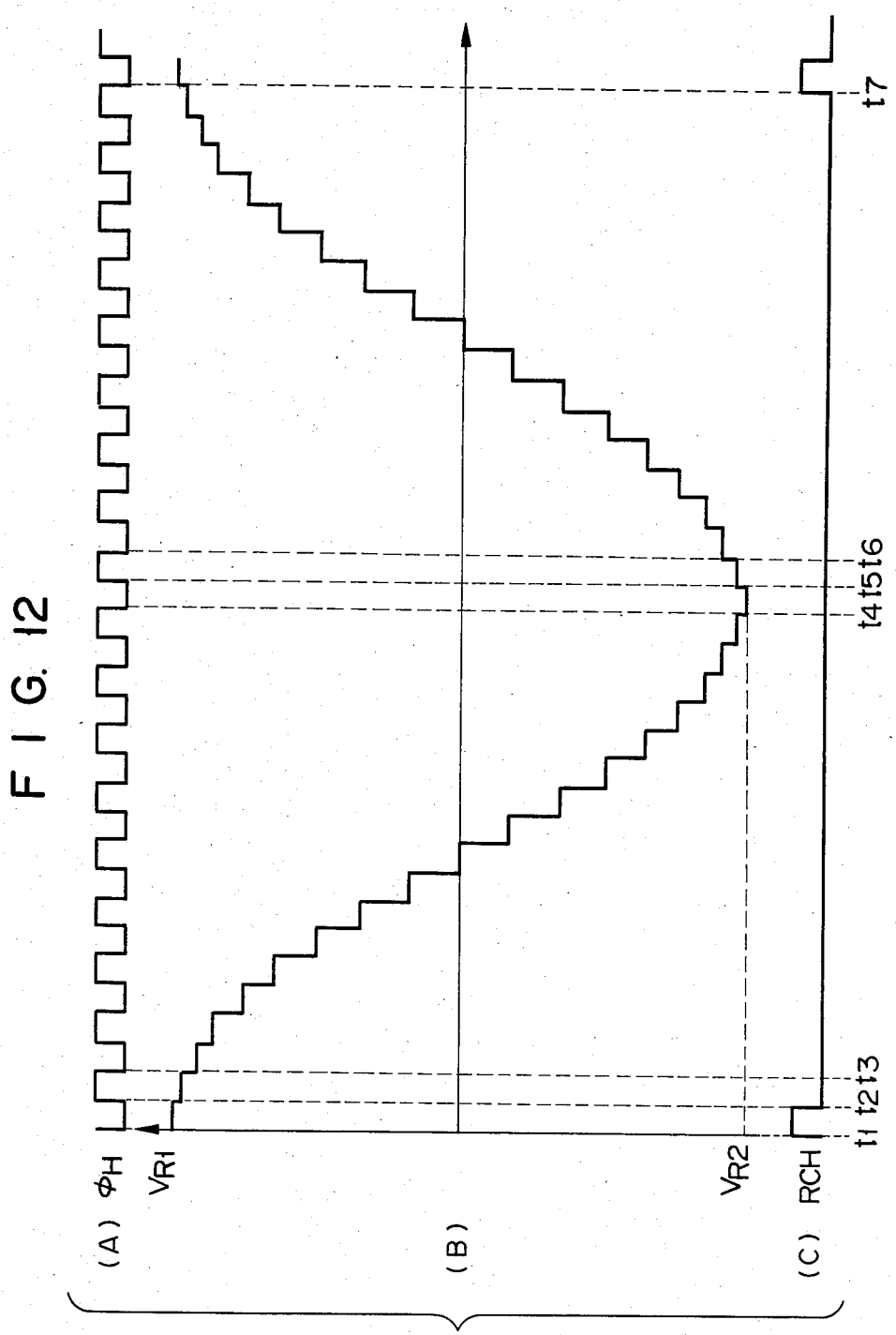

Suppose, as shown in FIG. 11T, that the RCH signal is generated at time $t_1$. Then, the switch 31 turns on, and the reference voltage $V_{R1}$ from the reference voltage generator 32 is produced through the switch 31 to the output terminal. FIG. 12B shows a characteristic of a voltage level at the output terminal 30. In order to facilitate understanding, the same symbols are used in FIGS. 12A through 12C as in FIGS. 11A through 11T for obtaining the coincidence of time, and the HGFD signal $\phi_H$ and the RCH signal are also shown in FIGS. 12A and 12C, respectively.

When the RCH signal is generated at the time $t_1$, the reference voltage $V_{R1}$ is generated at the output terminal 30: At this time, as is apparent from FIGS. 11A through 11T, all the output levels of the DFF circuits $D_1$ through $D_{18}$ are low. Therefore, the switch circuits $S_1$ through $S_{18}$ pass the reference voltage $V_{R1}$ to the capacitors $C_1$ through $C_{18}$. In other words, the reference voltage $V_{R1}$ is applied across the capacitors $C_1$ through $C_{18}$.

At the next trailing edge of the HGFD signal $\phi_H$ after the time $t_1$, namely, at the time $t_2$ as shown in FIG. 11B, the output Q level of the DFF circuit $D_1$ is inverted to be high, thereby rendering the RCH signal level low. Thus, the switch 31 turns off, and the reference voltage $V_{R2}$ is output to the capacitor $C_1$ through the switch circuit $S_1$. At this time, the voltage fluctuation appearing at the output terminal 30 is expressed by:

$$(V_{R2} - V_{R1})\frac{C_1}{C_H},$$

wherein $C_H$ is the parallel combined capacitance of the capacitors $C_1$ through $C_{18}$. Therefore, the voltage appearing at the output terminal 30 will be:

$$V_{R1} + (V_{R2} - V_{R1})\frac{C_1}{C_H}. \quad (2)$$

From equation (1), the voltage value expressed by equation (2) becomes lower than the reference voltage $V_{R1}$ as shown in FIG. 12B.

When the output Q level of the DFF circuit $D_2$ is inverted to be high at the trailing edge of the subsequent HGFD signal $\phi_H$ after the time $t_2$, namely, at $t_3$ as shown in FIG. 11C, the switch circuit $S_2$ passes the reference voltage $V_{R2}$ to the capacitor $C_2$. Thus, the voltage appearing at the output terminal 30 will be:

$$V_{R1} + (V_{R2} - V_{R1})\frac{C_1}{C_H} + (V_{R2} - V_{R1})\frac{C_1}{C_H}, \quad (3)$$

the value of which is lower than the value expressed by equation (2) as shown in FIG. 12B.

As described above, since the respective outputs Q of the DFF circuits $D_3$ through $D_{17}$ are sequentially level inverted to be high, the voltage at the output terminal 30 becomes gradually lower for every half period of the HGFD signal $\phi_H$, as shown in FIG. 12B.

Now at time $t_4$, when the output Q level of the DFF circuit $D_{18}$ is inverted to be high, as shown in FIG. 11S, the switch circuit $S_{18}$ passes the reference voltage $V_{R2}$ to the capacitor $C_{18}$. Therefore, the voltage appearing at the output terminal 30 will be:

$$V_{R1} + (V_{R2} - V_{R1})\frac{C_1}{C_H} + (V_{R2} - V_{R1})\frac{C_2}{C_H} + \quad (4)$$

$$(V_{R2} - V_{R1})\frac{C_{18}}{C_H}$$

$$= V_{R1} + \frac{(V_{R2} - V_{R1})C_H}{C_H}$$

$$= V_{R2}.$$

Thus, half the period of the stepped high-group-sine-wave signal is obtained.

The capacitance of the capacitors $C_1$ through $C_{18}$ is a factor to determine the magnitude of the voltage fluctuation. Therefore, in FIG. 9 the capacitances of the capacitors $C_1$ through $C_{18}$ are set to be symmetrical. That is, the capacitances of the left most and right most capacitors $C_1$ and $C_{18}$ are minimum, and those of the center capacitors $C_9$ and $C_{10}$ are maximum. The capacitances of the capacitors $C_2$ to $C_8$ and $C_{15}$ to $C_{11}$ gradually become greater. Thus, as shown in FIG. 12B, the stepped voltage fluctuation of the high-group-sine-wave signal is controlled to be approximate to the genuine sine wave.

At time $t_4$, the voltage across the capacitors $C_1$ through $C_{18}$ in FIG. 9 becomes the reference voltage $V_{R2}$.

At the leading edge of the HGFD signal $\phi_H$ after time $t_4$, namely, at time $t_5$ as shown in FIG. 11B, when the output Q level of the DFF circuit $D_1$ is inverted to be low, the switch circuit $S_1$ passes the reference voltage $V_{R1}$ to the capacitor $C_1$. Therefore, the voltage generated at the output terminal 30 will be:

$$V_{R2} + (V_{R1} - V_{BR2})\frac{C_1}{C_H}. \quad (5)$$

In view of the equation (1), the voltage value expressed by the equation (5) becomes higher than the reference voltage $V_{R2}$, as shown in FIG. 12B.

At the trailing edge of the next HGFD signal $\phi_H$ after the time $t_5$, namely, at the time $t_6$ as shown in FIG. 11C, when the output Q level of the DFF circuit $D_2$ is inverted to be low, the switch circuit $S_2$ passes the reference voltage $V_{R1}$ to the capacitor $C_2$. Therefore, the output voltage at the output terminal 30 will be:

$$V_{R2} + (V_{R1} - V_{R2})\frac{C_1}{C_H} + (V_{R1} - V_{R2})\frac{C_2}{C_H}. \quad (6)$$

Therefore, the voltage value becomes higher than the value expressed by equation (5), as shown in FIG. 12B.

As described above, since the output Q levels of the DFF circuits $D_3$ through $D_{17}$ are sequentially inverted to become low, the voltage appearing at the output terminal 30 becomes sequentially higher for every half cycle of the HGFD signal $\phi_H$, as shown in FIG. 12B.

At time $t_7$, as shown in FIG. 11S, when the output Q level of the DFF circuit $D_{18}$ is inverted to become low, the RCH signal is generated as shown in FIG. 11T. Then, the switch 31 is turned on and the voltage at the output terminal 30 is returned to the original reference voltage $V_{R1}$. As a result, the first cycle of the high-group-sine-wave signal is completed.

FIG. 13 shows a low-group-sine-wave generator 17. The low-group-sine-wave generator 17 has a similar construction to that of the high-group-sine-wave generator 16. Thus, the same numerals are used for the same parts in FIG. 9, and only the different parts will be described.

The low-group-sine-wave generator 17 generates a sine wave signal, the cycle of which is equal to the sixteen cycles of the LGFD signal $\phi_L$. The low-group-sine-wave generator 17 differs from the high-group-sine-wave generator 16 in that an 8-bit shift counter 38, which is comprised of sixteen serially connected DFF circuits $D_1$ through $D_{16}$, is adopted. The LGFD signal $\phi_L$ is supplied to the input terminal 28a. In this case, the high level output of the NOR circuit 29 will be the RCL signal.

The capacitances of the capacitors $C_1$ through $C_{16}$ are set to be symmetrical. That is, in FIG. 11 the capacitances of the left most and right most capacitors $C_1$ and $C_{16}$ are minimum, and those of the center capacitors $C_8$ and $C_9$ are maximum. The capacitances of the capacitors $C_2$ to $C_7$ and $C_{15}$ to $C_{10}$ gradually become greater.

Figure 14:
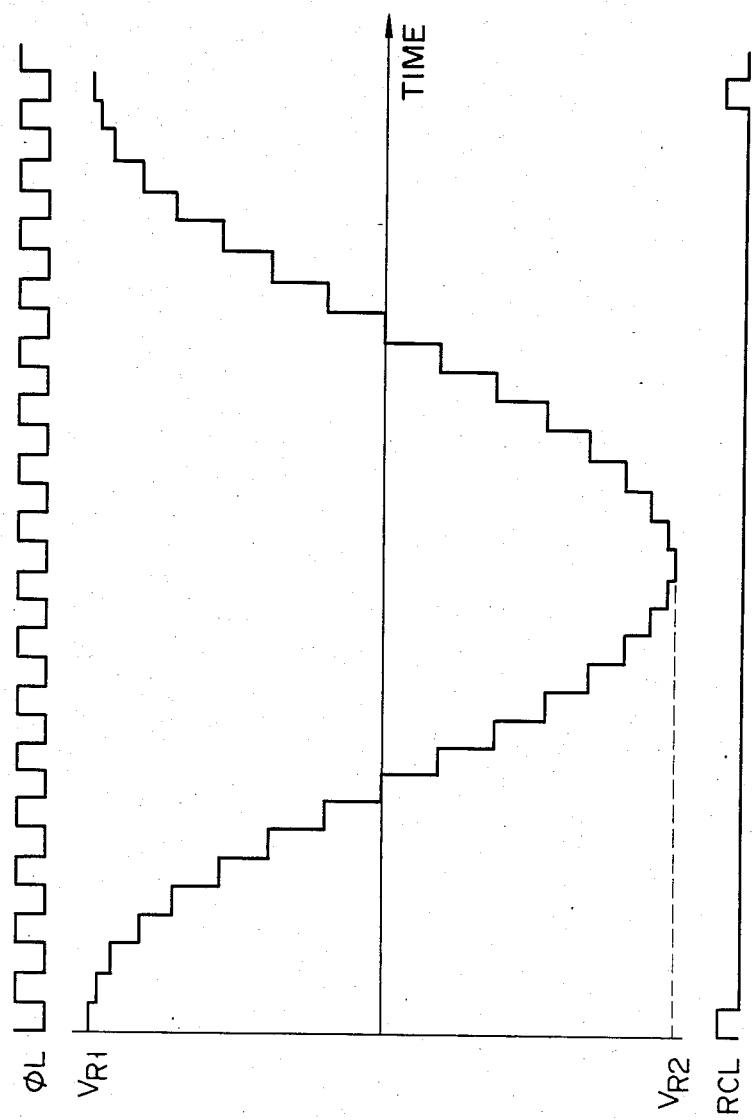
FIGS. 14A through 14C are timing charts for explaining the operation of the low-group-sine-wave generator in FIG. 13.

The operation of the low-group-sine-wave generator 17 is similar to that of the high-group-sine-wave generator 16. Therefore, as shown in FIG. 14B, the low-group-sine-wave signal, the cycle of which is equal to sixteen cycles of the LGFD signal $\phi_L$, can be obtained.

According to the high- and low-group-sine-wave generators 16 and 17, the high- and low-group-sine-wave signals are obtained at the output terminal 30 by sequentially varying the voltage applied across the capacitors $C_1$ through $C_{18}$ and $C_1$ through $C_{16}$. Therefore, no stationary current flows, thereby reducing the overall dissipated current and enabling the apparatus to operate at a low power supply voltage.

Figure 15:
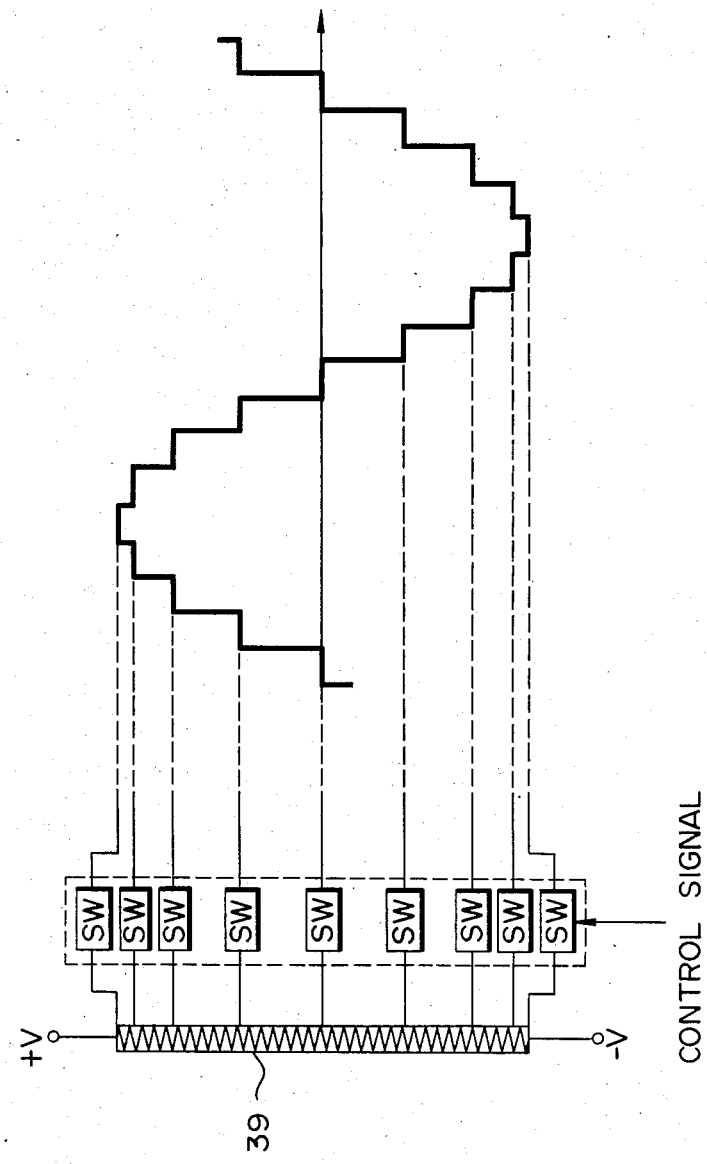
FIGS. 15A and 15B are views for explaining the prior-art sine-wave generator.

In the prior-art sine-wave generator, as shown in FIG. 15A, the reference voltages $+V$ and $-V$ are applied across the resistor 39. Furthermore, a plurality of switches SW are connected to the respective predetermined positions of the resistor 39. Thus, by turning on and off the switches SW according to a control signal, a sine wave as shown in FIG. 15B is obtained. Therefore, in the prior art circuit, a stationary current always flows into the resistor 39 so that the dissipated current is high, and it is difficult to operate at a low power supply voltage.

However, the high- and low-group-sine-wave generators 16 and 17, as shown in FIGS. 9 and 13, respectively, reduce the dissipated current, enable the operation at a lower power supply voltage, and facilitate the integration of the DTMF signal generating apparatus with CMOS devices.

To obtain a preferred high-group-sine-wave signal, the ratio of the capacitances of the capacitors $C_1$ through $C_{18}$ in the high-group-sine-wave generator 16 is set, for example, as in TABLE II when the parallel combined capacitance $C_H$ of the capacitors $C_1$ through $C_{18}$ is set to 1.

TABLE II

| Capacitor | Ratio |
|---|---|
| $C_1$ | 0.0076 |
| $C_2$ | 0.0226 |
| $C_3$ | 0.0368 |
| $C_4$ | 0.0500 |
| $C_5$ | 0.0616 |
| $C_6$ | 0.0714 |
| $C_7$ | 0.0790 |
| $C_8$ | 0.0842 |
| $C_9$ | 0.0868 |
| $C_{10}$ | 0.0868 |
| $C_{11}$ | 0.0842 |
| $C_{12}$ | 0.0790 |
| $C_{13}$ | 0.0714 |
| $C_{14}$ | 0.0616 |
| $C_{15}$ | 0.0500 |
| $C_{16}$ | 0.0368 |
| $C_{17}$ | 0.0226 |
| $C_{18}$ | 0.0076 |
| $C_H$ | 1 |

In this case, the capacitance ratio of the capacitors $C_1$ through $C_{18}$ is determined as follows. The parallel combined capacitance $$\sum_{i=1}^{N} C_i$$

of the capacitor $C_1$ to the nth capacitor is given by:

$$\sum_{i=1}^{N} C_i = \frac{1}{2} C_H \left[ 1 - \cos\left(\pi \times \frac{N}{18}\right) \right], \quad (7)$$

when the parallel combined capacitance of the capacitors $C_1$ through $C_{18}$ is set to 1. Therefore, the capacitance when $N=1$, namely, of the capacitor $C_1$, is given by:

$$\sum_{i=1}^{1} C_i = \frac{1}{2}\left[ 1 - \cos\left(\pi \times \frac{1}{18}\right) \right] = 0.0076. \quad (8)$$

Further, the parallel combined capacitance when $N=2$, namely, of capacitors $C_1$ and $C_2$, is given by:

$$\sum_{i=1}^{2} C_i = \frac{1}{2}\left[ 1 - \cos\left(\pi \times \frac{2}{18}\right) \right] = 0.0302, \quad (9)$$

and the parallel combined capacitance when $N=3$, namely, of the capacitors $C_1$ through $C_3$, is given by:

$$\sum_{i=1}^{3} C_i = \frac{1}{2}\left[ 1 - \cos\left(\pi \times \frac{3}{18}\right) \right] = 0.0670. \quad (10)$$

The parallel combined capacitances thus obtained are summarized as in TABLE III.

TABLE III

| N | Capacitance |
|---|---|
| 1 | 0.0076 |
| 2 | 0.0302 |
| 3 | 0.0670 |
| 4 | 0.1170 |
| 5 | 0.1786 |
| 6 | 0.2500 |
| 7 | 0.3290 |
| 8 | 0.4132 |

TABLE III-continued

| N | Capacitance |
|---|---|
| 9 | 0.5000 |
| 10 | 0.5868 |
| 11 | 0.6710 |
| 12 | 0.7500 |
| 13 | 0.8214 |
| 14 | 0.8830 |
| 15 | 0.9330 |
| 16 | 0.9698 |
| 17 | 0.9924 |
| 18 | 1.0000 |

For example, when N=2, the capacitance will be $(C_1+C_2)$. Therefore, the capacitance ratio of the capacitor $C_2$ shown in TABLE II is obtained by subtracting the capacitance when N=1 from $(C_1+C_2)$, that is: $0.0302-0.0076=0.0226$.

The capacitance ratios of the capacitors $C_1$ through $C_{16}$ in the low-group-sine-wave generator 17 are also obtained in the same manner as described above and are shown in TABLE IV.

TABLE IV

| Capacitor | Ratio |
|---|---|
| $C_1$ | 0.0096 |
| $C_2$ | 0.0285 |
| $C_3$ | 0.0462 |
| $C_4$ | 0.0621 |
| $C_5$ | 0.0758 |
| $C_6$ | 0.0865 |
| $C_7$ | 0.0938 |
| $C_8$ | 0.0975 |
| $C_9$ | 0.0975 |
| $C_{10}$ | 0.0938 |
| $C_{11}$ | 0.0865 |
| $C_{12}$ | 0.0758 |
| $C_{13}$ | 0.0621 |
| $C_{14}$ | 0.0462 |
| $C_{15}$ | 0.0285 |
| $C_{16}$ | 0.0096 |
| $C_H$ | 1 |

Figure 16:
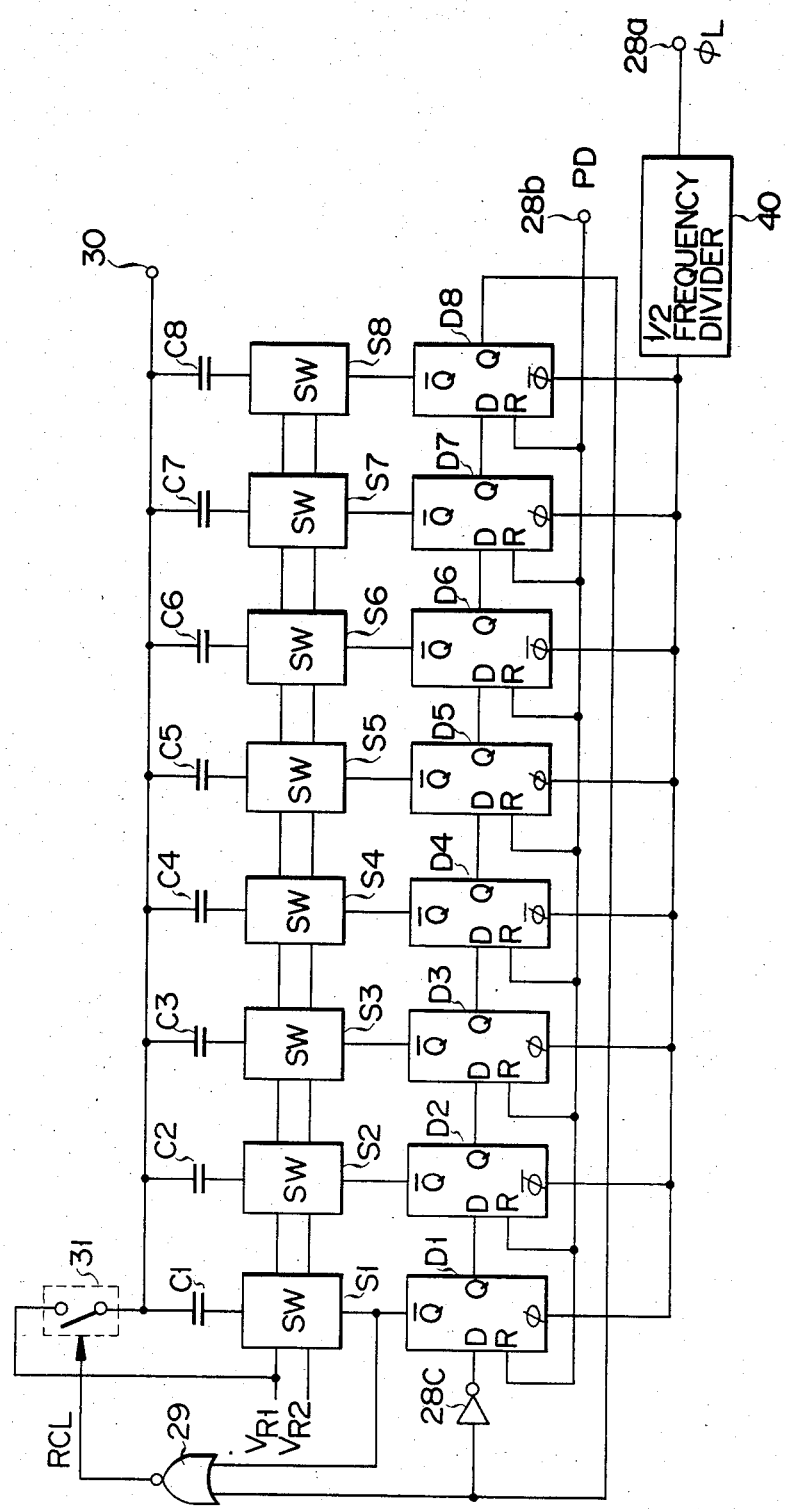
FIG. 16 is a block diagram showing a modified low-group-sine-wave generator in FIG. 13.
Figure 18:
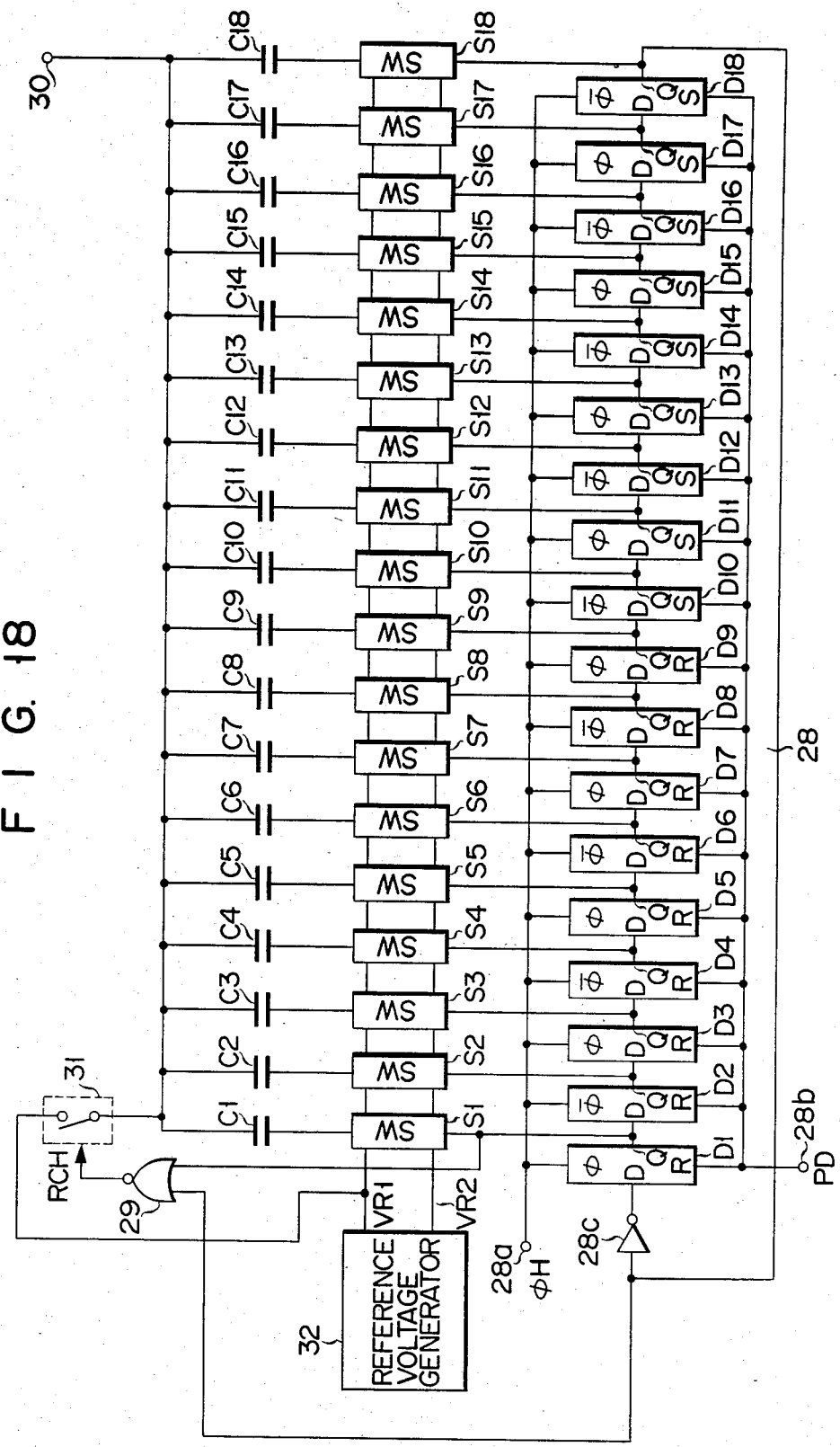
FIG. 18 is a block diagram showing a modified high-group-sine-wave generator in FIG. 9.

The high- and low-group-sine-wave generators 16 and 17 can be modified as shown in FIG. 16 in which the modified low-group-sine-wave generator 17 is exemplified. In this modification, eight DFF circuits $D_1$ through $D_8$, eight switch circuits $S_1$ through $S_8$, and eight capacitors $C_1$ through $C_8$ are used. The LGFD signal $\phi_L$ supplied through the input terminal 28a is fed through a half frequency divider 40 to the clock input terminals $\phi$ and $\bar{\phi}$ of the respective DFF circuits $D_1$ through $D_8$.

According to the above construction, when the LGFD signal $\phi_L$, as shown in FIG. 17A, is supplied to the input terminal 28a, the output of the half frequency divider 40 will be as shown in FIG. 15B. Then, the DFF circuits $D_1$ through $D_8$, switch circuits $S_1$ through $S_8$, and capacitors $C_1$ through $C_8$ are operated as described above, thereby to obtain the low-group-sine-wave signal as shown in FIG. 17C. This low-group-sine-wave signal has a cycle which is equal to sixteen cycles of the LGFD signal $\phi_L$, the same as the signal in FIG. 14B except for the resolution. Therefore, when the accuracy is not critical, the construction in FIG. 16 can be adopted, thereby further simplifying the construction. FIG. 17D shows the waveform of the RCL signal.

The high-group-sine-wave generator 16 can also be simplified in the same manner as described above. In this case, the DFF circuits, switch circuits, and capacitors are provided in nines. Then, the HGFD signal $\phi_H$ is divided by half and is supplied to the clock input terminal $\phi$ or $\bar{\phi}$.

The high-group-sine-wave generator 16 can further be constructed as shown in FIG. 16. That is, the set terminals S of the DFF circuits $D_{10}$ through $D_{18}$ are connected to the input terminal 28b. The output levels Q of the DFF circuits $D_1$ through $D_9$ are reset to low, and the output levels Q of the DFF circuits $D_{10}$ through $D_{18}$ are set to high when the level of the power down signal PD is inverted from high to low. Thus, a sine wave signal is obtained. The use of the sine wave signal or the cosine wave signal can arbitrarily be selected.

Also in the low-group-sine-wave generator 17, a sine wave signal is obtained by connecting the set terminals of the respective DFF circuits $D_9$ through $D_{16}$ to the input terminal 28b.

FIG. 19 shows the output-signal-mixing circuit 18. The high-group-sine-wave signal from the high-group-sine-wave generator 16 is supplied to the input terminal 41, which is grounded through the serially connected capacitors $C_{H1}$ and $C_{H2}$. The connection between the capacitors $C_{H1}$ and $C_{H2}$ is connected through the switch circuit 42 to a power supply terminal 43 to which a reference voltage $V_{R3}$ is applied as well as to the non-inverted input terminal "+" of an operational amplifier $OP_1$. The switch circuit 42 is turned on and off according to the high or low level of the RCH signal generated from the NOR circuit 29 in the high-group-sine-wave generator 16. The circuit having the capacitors $C_{L1}$ and $C_{L2}$, switch circuits 46, and others comprises the low frequency level converter 48.

The operational amplifiers $OP_1$ and $OP_2$ comprise a voltage follower in which the respective outputs of the amplifiers $OP_1$ and $OP_2$ are connected to the inverted input terminals "−" thereof and serve as buffer amplifiers 49 and 50 for impedance conversion. The output terminals of the buffer amplifiers 49 and 50 are mutually connected through the resistors $R_1$ and $R_2$, and the connecting point is connected to the base of the NPN transistor $Tr_1$. The collector of the transistor $Tr_1$ is connected to the power supply terminal 51 to which the DC voltage $+V_C$ is applied, and the emitter thereof is connected to the output terminal 52. The buffer amplifiers 49 and 50, the resistors $R_1$ and $R_2$ and the transistor $Tr_1$ comprise a mixing circuit 53.

In the output-signal-mixing circuit 18 as constructed above, the high-group-sine-wave signal supplied to the input terminal 41 is level converted according to the capacitance ratio $C_{H1}$ and $C_{H2}$. The switch circuit 42 turns on for every cycle of the level converted signal to thereby shift the level of the signal against the reference voltage $V_{R3}$. The low-group-sine-wave signal supplied to the input terminal 45 is also level converted according to the capacitance ratio of the capacitors $C_{L1}$ and $C_{L2}$. Further, the switch circuit 46 turns on for every cycle of the level converted signal to thereby shift the level of the signal against the reference voltage $V_{R3}$. Such a level conversion facilitates combining the voltages at the mixing circuit 53. The high- and low-group-sine-wave signals, which are level converted as described above, are combined in voltage through the buffer amplifiers 49 and 50 and the resistors $R_1$ and $R_2$, respectively, and then current converted by the transistor $Tr_1$ to be produced in the telephone communication line as the DTMF signal through the output terminal 52.

In summary, the output-signal-mixing circuit 18 serves to give the DTMF signal a voltage amplitude and an output impedance adapted to be fed to the telephone communication line.

Thus, according to the output-signal-mixing circuit 18, since the input impedance of the buffer amplifiers 49 and 50 at the signal input section of the mixing circuit 53 is high, level converters 44 and 48 with high impedance, that is, with capacitors $C_{H1}$, $C_{H2}$, $C_{L1}$ and $C_{L2}$ which serves as the signal supplying section to the mixing circuit 53, can be adopted to thereby obtain a suitable DTMF signal and to simplify its construction.

Figure 20A:
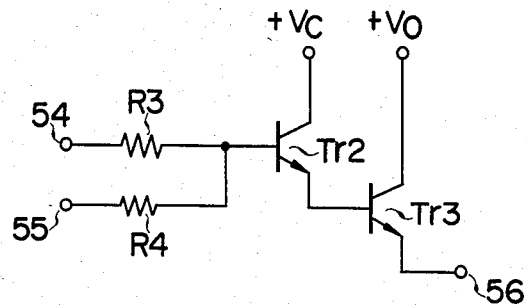
FIGS. 20A and 20B show prior art output-signal-mixing circuits.
Figure 20B:
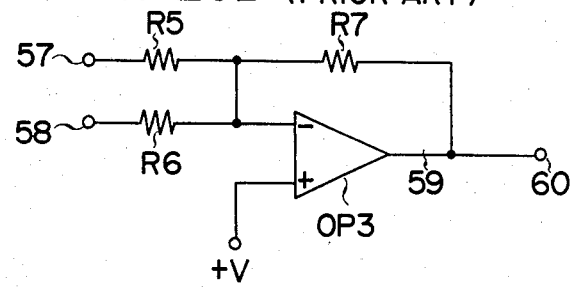

In the prior art output-signal-mixing circuit, as shown in FIG. 20A, the currents of the high- and low-group-sine-wave signals supplied to the input terminals 54 and 55 are summed in term of current through the resistors $R_3$ and $R_4$ to obtain the DTMF signal from the output terminal 56 through the transistors $Tr_2$ and $Tr_3$, or as shown in FIG. 20B, the high- and low-group-sine-wave signals are combined through the resistors $R_5$ and $R_6$ to obtain the DTMF signal from the output terminal 60 through the amplifier 59, which comprises an operational amplifier $OP_3$, and a resistor $R_7$. Therefore, because of low input impedance, only an input signal source with low impedance can be used, and it is especially difficult to operate at a low voltage.

However, according to the output-signal-mixing circuit 18, the capacitive elements as described above can be used as the input signal source.

FIGS. 21 through 25 show other embodiments of the output-signal-mixing circuit. In the output-signal-mixing circuit in FIG. 21, the buffer amplifiers 49 and 50 using the N channel MOS transistors $Q_3$ through $Q_6$ form a source follower. Such a simple construction makes it possible to raise the input impedance and lower the output impedance as well as to facilitate the low voltage operation.

In another embodiment shown in FIG. 22, N channel MOS transistors $Q_7$ through $Q_9$ form source coupled pairs. The combined source voltage of the transistors $Q_7$ and $Q_8$ is output as the DTMF signal.

Furthermore, in another embodiment of FIG. 23, the high- and low-group-sine-wave signals are combined through integrators comprising capacitors 61a and 62a, operational amplifiers $OP_4$ and $OP_5$, and resistors $R_8$ and $R_9$. The combined signal is output as the DTMF signal through an amplifier 63 comprising a resistor $R_{10}$ and an operational amplifier $OP_6$.

Yet in another embodiment shown in FIG. 24, the high- and low-group-sine-wave signals are combined through similar source follower circuits 66 and 67 and resistors $R_{11}$ and $R_{12}$ shown in FIG. 19. The DTMF signal is obtained through an amplifier comprising an operational amplifier $OP_7$, resistors $R_{13}$, $R_{14}$ and $R_{15}$, and a transistor $Tr_4$. The voltage applied at an inverted input terminal "−" of the operational amplifier $OP_7$ is achieved from the reference voltage $V_{R4}$ through a source follower circuit 69. The resistor $R_{13}$ is provided for an input resistance of the operational amplifier $OP_7$, and the resistors $R_{14}$ and $R_{15}$ are provided for adjusting the gain of the amplifier 68.

Furthermore, in another embodiment in FIG. 25, the combined signal of resistors $R_{11}$ and $R_{12}$ is fed to a transistor $Tr_4$ through an amplifier 70 comprising an operational amplifier $OP_3$ and resistors $R_{16}$ and $R_{17}$. In this case, the resistor $R_{16}$ serves to adjust the gain of the amplifier 70, and the resistor $R_{17}$ serves as a input resistor for the operational amplifier $OP_2$.

If no level conversions of the high- and low-group-sine-wave signals are required, in the output-signal-mixing circuit 18, the high- and low-group-sine-wave signals output from the high- and low-group-sine-wave generators 16 and 17 may be combined without passing through the high and low group level converting circuits 44 and 48, as described above.

Although a preferred embodiment of the present invention has been illustrated in the accompanying drawings and described in the foregoing detailed description, it will be understood that the invention is not limited to the embodiments disclosed, but is capable of numerous arrangements, modifications and substitutions of its parts and elements without departing from the spirit of the invention.

What is claimed is:

1. A dual-tone multiple-frequency-signal generating apparatus, comprising:
   key input means in which keys are arranged in a matrix;
   reference-frequency-signal generating means for generating a reference frequency signal;
   frequency dividing means for dividing the reference frequency signal from said reference-frequency-signal generating means corresponding to a key actuated by said key input means and for producing first and second frequency-divided signals;
   sine-wave-signal generating means for generating respective first and second sine wave signals having approximately the same cycles as those of first and second standard frequencies using the first and second frequency-divided signals from said frequency dividing means;
   first level converting means with high input impedance for receiving and level converting the first sine wave signal;
   second level converting means with high input impedance for receiving and level converting the second sine wave signal; and
   output-signal-mixing means connected to said first and second level converting means for combining the first and second level converted sine wave signals produced from said first and second level converting means to produce a dual-tone multiple frequency signal.

2. An apparatus according to claim 1, wherein said first level converting means comprises:
   first and second serially connected capacitors in which one terminal is supplied with the first sine wave signal and the other terminal are grounded; and
   a switch circuit with one terminal being connected to a reference voltage and the other terminal being connected to a connection of said first and second capacitors.

3. An apparatus according to claim 1, wherein said second level converting means comprises:
   first and second serially connected capacitors in which one terminal is supplied with the second sine wave signal and the other terminal is grounded; and
   a switch circuit with one terminal being connected to a reference voltage and the other terminal being connected to a connection of said first and second capacitors.

4. An apparatus according to claim 1, wherein said first and second level converting means comprises:
   first and second serially connected capacitors in which the terminals on one side of the capacitors are supplied with the first and second sine wave signals and the terminals on the other side thereof are grounded:

a switch circuit with one terminal being connected to a reference voltage and other terminal being connected to a connection of said first and second capacitors;

said output-signal-mixing means comprising first and second buffer amplifiers connected to a connection of said first and second capacitors for performing an impedance conversion;

first and second serially connected resistors with the terminals on one side of the resistors being connected to outputs of said first and second buffer amplifiers, respectively, and the terminals on the other side thereof are commonly connected; and a transistor whose base is connected to the common connection of said first and second resistors.

5. An apparatus according to claim 4, wherein said first and second buffer amplifiers are operational amplifiers whose positive input terminals are connected to the connection of said first and second capacitors and whose negative input terminals are connected to the output terminals of said buffer amplifiers.

6. An apparatus according to claim 1, wherein each of said first and second level converting means comprises:

first and second serially connected capacitors in which the terminals on one side of the capacitors are supplied with the first and second sine wave signals and the terminals on the other side thereof are grounded; and a switch circuit whose one terminal is connected to a reference voltage and whose other terminal is connected to the connection of said first and second capacitors, and said output-signal-mixing means comprises:

first and second MOS transistors in which a gate of one MOS transistor is connected to the connection of said first and second capacitors to form a source follower; and output resistors connected to the serial connection of said first and second transistors.

7. An apparatus according to claim 1, wherein said output-signal-mixing means comprises:

first and second MOS transistors whose sources are commonly connected and serve as source coupled pairs; and a third MOS transistor whose drain is connected to the common connection of sources of said first and second MOS transistors and serves as a load, the source combined voltage of said first and second MOS transistors being produced as a dual-tone multiple frequency signal.

8. An apparatus according to claim 1, wherein said output-signal-mixing means comprise:

first and second integrators;

first and second switch circuits connected to said first and second integrators in parallel, respectively; and an operational amplifier connected to the common connection of said first and second integrators for producing a combined output signal from said first and second integrators as a dual-tone multiple frequency signal.

9. An apparatus according to claim 1, wherein said output-signal-mixing means comprises:

first and second source follower circuits whose outputs are commonly connected through a resistor so as to receive the first and second sine wave signals and to produce the combined signal;

an operational amplifier whose positive input terminal is supplied with a combined signal of the first and second sine wave signals and whose negative input terminal is supplied with a reference voltage through a third source follower circuit; and a transistor connected to the output of said operational amplifier.

10. An apparatus according to claim 9, wherein the output of the operational amplifier is fed back to its negative input terminal through a resistor.

11. An apparatus according to claim 1, wherein said first and second level converting means and said output-signal-mixing means comprise:

first and second source follower circuits whose outputs are commonly connected through a resistor so as to receive the first and second sine wave signals and to produce the combined signal;

an operational amplifier whose negative input terminal is supplied with a combined signal of the first and second sine wave signals and whose positive input terminal is supplied with a reference voltage through a third source follower circuit; and a transistor connected to the output of said operational amplifier.

12. An apparatus according to claim 11, wherein the output of the operational amplifier is fed back to its negative input terminal through a resistor.

13. A dual-tone multiple-frequency-signal generating apparatus, comprising:

key input means in which keys are arranged in a matrix;

reference-frequency-signal generating means for generating a reference frequency signal;

frequency dividing means for dividing the reference frequency signal from said reference-frequency-signal generating means corresponding to a key actuated in said key input means and for producing first and second frequency-divided signals;

shifting means which comprises a plurality of bi-stable circuits and which sequentially shifts the divided frequency signal input from said frequency dividing means within a predetermined period;

sine-wave-signal generating means for generating respective first and second sine wave signals having approximately the same cycles as those of first and second standard frequencies using the first and second frequency-divided signals from said frequency dividing means, including:

a plurality of switches for selectively passing the first and second voltage levels, which are different than each other, corresponding to the outputs of the respective bi-stable circuits in said shifting means, and a plurality of capacitive elements in which the terminals on one side of the capacitive elements are supplied with the first or second voltage level passed by the plurality of switches and the terminals on the other side thereof are commonly connected, the first or second voltage level being applied to the common connection for every cycle of said shifting means to produce sine wave signals from the plurality of common connections; and mixing means for combining the first and second sine wave signals output from said sine-wave-signal generating means to produce a dual-tone multiple frequency signal.

14. A dual-tone multiple-frequency-signal generating apparatus comprising:

key input means in which keys are arranged in a matrix;

reference-frequency-signal generating means for generating a reference frequency signal;

frequency dividing means for dividing the reference frequency signal from said reference-frequency-signal generating means corresponding to a key actuated in said key input means and for producing first and second frequency-divided signals;

shifting means which comprises a plurality of bi-stable circuits and which sequentially shifts the divided frequency signal input from said frequency dividing means within a predetermined period;

high- and low-group-sine-wave-signal generating means for generating respective first and second sine wave signals having approximately the same cycles as those of first and second standard frequencies using the first and second frequency-divided signals from said frequency dividing means, including:

a plurality of switches for selectively passing the first and second voltage levels, which are different than each other, corresponding to the outputs of the respective bi-stable circuits in said shifting means, and a plurality of capacitive elements in which the terminals on one side of the capacitive elements are supplied with the first or second voltage level passed through the plurality of switches and the terminals on the other side thereof are commonly connected, the first or second voltage level being applied to the common connection for every cycle of said shifting means to produce sine wave signals from the plurality of common connections;

first level converting means with high input impedance for receiving and level converting the first sine wave signal;

second level converting means with high input impedance for receiving and level converting the second sine wave signal; and mixing means connected to said first and second level converting means for combining the first and second level converted sine wave signals output from said first and second level converting means to produce a dual-tone multiple frequency signal.

15. A dual-tone multiple-frequency-signal generating apparatus, comprising:

key input means in which keys are arranged in a matrix;

reference-frequency-signal generating means, including MOS semiconductor devices and a natural oscillation element, for generating a reference frequency signal having an oscillating frequency of approximately 480 KHz;

frequency dividing means for dividing the reference frequency signal from said reference-frequency-signal generating means corresponding to a key operated in said key input means and for producing first and second frequency-divided signals;

sine-wave-signal generating means for generating respective first and second sine wave signals having approximately the same cycles as those of first and second standard frequencies using the first and second frequency-divided signals from said frequency dividing means; and mixing means for mixing the first and second sine wave signals output from said sine-wave-signal generating means to produce a dual-tone multiple frequency signal.

16. A dual-tone multiple-frequency-signal generating apparatus, comprising:

key input means in which keys are arranged in a matrix;

reference-frequency-signal generating means including a MOS semiconductor device and a natural oscillation element for generating a reference frequency signal having an oscillating frequency of approximately 480 KHz;

frequency dividing means for dividing the reference frequency signal from said reference-frequency-signal generating means corresponding to a key actuated in said key input means and for producing first and second frequency-divided signals;

sine-wave-signal generating means for generating respective first and second sine wave signals having approximately the same cycles as those of first and second standard frequencies using the first and second frequency-divided signals from said frequency dividing means;

first level converting means with high input impedance for receiving and level converting the first sine wave signal;

second level converting means with high input impedance for receiving and level converting the second sine wave signal; and mixing means connected to said first and second level converting means for combining the first and second level converted sine wave signals output from said first and second level converting means to produce a dual-tone multiple frequency signal.

17. A dual-tone multiple-frequency-signal generating apparatus, comprising:

key input means in which keys are arranged in a matrix;

reference-frequency-signal generating means, including MOS semiconductor devices and a natural oscillation element, for generating a reference frequency signal having an oscillating frequency of approximately 480 KHz;

frequency dividing means for dividing the reference frequency signal from said reference-frequency-signal generating means corresponding to a key actuated in said key input means and for producing first and second frequency-divided signals;

shifting means which comprises a plurality of bi-stable circuits and which sequentially shifts the divided frequency signal input from said frequency dividing means within a predetermined period;

sine-wave-signal generating means for generating respective first and second sine wave signals having approximately the same cycles as those of first and second standard frequencies using the first and second frequency-divided signals from said frequency dividing means, including:

a plurality of switches for selectively passing the first and second voltage levels, which are different each other, corresponding to the outputs of the respective bi-stable circuits in said shifting means, and a plurality of capacitive elements in which the terminals on one side of the capacitive elements are supplied with the first or second voltage level passed by the plurality of switches and the terminals on the other side thereof are commonly connected, the first or second voltage level being applied to the common connection for every cycle of said shifting means to produce sine wave signals from the plurality of common connections; and mixing means for combining the first and second sine wave signals output from said sine-wave-signal generating means to produce a dual-tone multiple frequency signal.

18. A dual-tone multiple-frequency-signal generating apparatus, comprising:

key input means in which keys are arranged in a matrix;

reference-frequency-signal generating means including MOS semiconductor devices and natural oscillation element for generating a reference frequency signal having an oscillating frequency of approximately 480 KHz;

frequency dividing means for dividing the reference frequency signal from said reference-frequency-signal generating means corresponding to a key actuated in said key input means and for producing first and second frequency-divided signals;

sine-wave-signal generating means for generating first and second sine wave signals having approximately the same cycles as those of first and second frequencies using the first and second frequency-divided signals from said frequency dividing means, including:

a plurality of switches for selectively passing the first and second voltage levels, which are different each other, corresponding to the outputs of the respective bi-stable circuits in said shifting means, and a plurality of capacitive elements in which the terminals on one side of the capacitive elements are supplied with the first or second voltage level passed by the plurality of switches, and the terminals on the other side thereof are commonly connected, the first or second voltage level being applied to the common connection for every cycle of said shifting means to produce sine wave signals from the plurality of common connections;

first level converting means with high input impedance for receiving and level converting the first sine wave signal;

second level converting means with high input impedance for receiving and level converting the second sine wave signal; and mixing means, connected to said first and second level converting means, for combining the first and second level converted sine wave signals output from said first and second level converting means to produce a dual-tone multiple frequency signal.

19. An apparatus according to claim 1, further comprising keyboard interface means, connected to said key input means and said frequency dividing means, for supplying to said frequency dividing means division ratios for achieving the said first and second frequency-divided signals using the reference frequency signal from the reference-frequency-signal generating means, corresponding to a key actuated in said key input means.

20. An apparatus according to claim 2, further comprising keyboard interface means, connected to said key input means and said frequency dividing means, for supplying to said frequency dividing means division ratios for achieving the said first and second frequency-divided signals using the reference frequency signal from the reference-frequency-signal generating means, corresponding to a key actuated in said key input means.

21. An apparatus according to claim 3, further comprising keyboard interface means, connected to said key input means and said frequency dividing means, for supplying to said frequency dividing means division ratios for achieving the said first and second frequency-divided signals using the reference frequency signal from the reference-frequency-signal generating means, corresponding to a key actuated in said key input means.

22. An apparatus according to claim 4, further comprising keyboard interface means, connected to said key input means and said frequency dividing means, for supplying to said frequency dividing means division ratios for achieving the said first and second frequency-divided signals using the reference frequency signal from the reference frequency-signal generating means, corresponding to a key actuated in said key input means.

23. An apparatus according to claim 5, further comprising keyboard interface means, connected to said key input means and said frequency dividing means, for supplying to said frequency dividing means division ratios for achieving the said first and second frequency-divided signals using the reference frequency signal from the reference-frequency-signal generating means, corresponding to a key actuated in said key input means.

24. An apparatus according to claim 6, further comprising keyboard interface means connected to said key input means and said frequency dividing means, for supplying to said frequency dividing means division ratios for achieving the said first and second frequency-divided signals using the reference frequency signal from the reference-frequency-signal generating means, corresponding to a key actuated in said key input means.

25. An apparatus according to claim 7, further comprising keyboard interface means, connected to said key input means and said frequency dividing means, for supplying to said frequency dividing means division ratios for achieving the said first and second frequency-divided signals using the reference frequency signal from the reference-frequency-signal generating means, corresponding to a. key actuated in said key input means.

26. An apparatus according to claim 8, further comprising keyboard interface means, connected to said key input means and said frequency dividing means, for supplying to said frequency dividing means division ratios for achieving the said first and second frequency-divided signals using the reference frequency signal from the reference-frequency-signal generating means, corresponding to a key actuated in said key input means.

27. An apparatus according to claim 9, further comprising keyboard interface means, connected to said key input means and said frequency dividing means, for supplying to said frequency dividing means division ratios for achieving the said first and second frequency-divided signals using the reference frequency signal from th reference-frequency-signal generating means, corresponding to a key actuated in said key input means.

28. An apparatus according to claim 10, further comprising keyboard interface means, connected to said key input means and said frequency dividing means, for supplying to said frequency dividing means division ratios for achieving the said first and second frequency-divided signals using the reference frequency signal from the reference-frequency-signal generating means, corresponding to a key actuated in said key input means.

29. An apparatus according to claim 11, further comprising keyboard interface means, connected to said key input means and said frequency dividing means, for supplying to said frequency dividing means division ratios for achieving the said first and second frequency-divided signals using the reference frequency signal from the reference-frequency-signal generating means, corresponding to a key actuated in said key input means.

30. An apparatus according to claim 12, further comprising keyboard interface means, connected to said key input means and said frequency dividing means, for supplying to said frequency dividing means division ratios for achieving the said first and second frequency-divided signals using the reference frequency signal from the reference-frequency-signal generating means, corresponding to a key actuated in said key input means.

31. An apparatus according to claim 13, further comprising keyboard interface means, connected to said key input means and said frequency dividing means, for supplying to said frequency dividing means division ratios for achieving the said first and second frequency-divided signals using the reference frequency signal from the reference-frequency-signal generating means, corresponding to a key actuated in said key input means.

32. An apparatus according to claim 14, further comprising keyboard interface means, connected to said key input means and said frequency dividing means, for supplying to said frequency dividing means division ratios for achieving the said first and second frequency-divided signals using the reference frequency signal from the reference-frequency-signal generating means, corresponding to a key actuated in said key input means.

33. An apparatus according to claim 15, further comprising keyboard interface means, connected to said key input means and said frequency dividing means, for supplying to said frequency dividing means division ratios for achieving the said first and second frequency-divided signals using the reference frequency signal from the reference-frequency-signal generating means, corresponding to a key actuated in said key input means.

34. An apparatus according to claim 16, further comprising keyboard interface means, connected to said key input means and said frequency dividing means, for supplying to said frequency dividing means division ratios for achieving the said first and second frequency-divided signals using the reference frequency signal from the reference-frequency-signal generating means, corresponding to a key actuated in said key input means.

* * * * *